United States Patent
Kim et al.

(10) Patent No.: US 9,674,022 B2
(45) Date of Patent: Jun. 6, 2017

(54) APPARATUS AND METHOD FOR SENDING AND RECEIVING BROADCAST SIGNALS

(71) Applicant: LG ELECTRONICS INC., Seoul (KR)

(72) Inventors: Jaehyung Kim, Seoul (KR); Chulkyu Mun, Seoul (KR); Woosuk Ko, Seoul (KR); Jongseob Baek, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/918,323

(22) Filed: Oct. 20, 2015

(65) Prior Publication Data

US 2016/0285661 A1    Sep. 29, 2016

Related U.S. Application Data

(60) Provisional application No. 62/137,800, filed on Mar. 24, 2015, provisional application No. 62/138,962, (Continued)

(51) Int. Cl.
*H04L 27/14* (2006.01)
*H04L 27/26* (2006.01)
(Continued)

(52) U.S. Cl.
CPC .......... *H04L 27/265* (2013.01); *H04L 1/0042* (2013.01); *H04L 5/005* (2013.01);
(Continued)

(58) Field of Classification Search
CPC ............. H04L 27/2627; H04L 27/2649; H04L 27/2602; H04L 27/2647; H04L 27/265;
(Continued)

(56) References Cited

U.S. PATENT DOCUMENTS 9,219,630 B2 *  12/2015  Mun ..................... H04L 27/265
2009/0213853 A1   8/2009  Kwon et al.
(Continued)

FOREIGN PATENT DOCUMENTS

JP    4374023 B2    12/2009
JP    2010-124066 A    6/2010
(Continued)

OTHER PUBLICATIONS

ETSI EN 302 755 VI .3.1 (Nov. 2011); Digital Video Broadcasting (DVB); Frame structure channel coding and modulation for a second generation digital terrestrial televeision broadcasting system (DVB-TV), Nov. 2011.*

*Primary Examiner* — Siu Lee
(74) *Attorney, Agent, or Firm* — Birch, Stewart, Kolasch & Birch, LLP

(57) ABSTRACT

A broadcast signal receiver is disclosed. A broadcast signal receiver according to the present invention comprises a synchronization/demodulation module configured to perform signal detection and OFDM demodulation on a received broadcast signal; a frame parsing module configured to derive service data by parsing a signal frame of the received broadcast signal; a demapping and decoding module configured to convert an input signal into bit domain and to perform deinterleaving; and an output processing module configured to receive service data and to output a data stream.

18 Claims, 55 Drawing Sheets

Related U.S. Application Data filed on Mar. 26, 2015, provisional application No. 62/142,487, filed on Apr. 3, 2015, provisional application No. 62/145,456, filed on Apr. 9, 2015, provisional application No. 62/152,050, filed on Apr. 24, 2015.

(51) Int. Cl.
| | | |
|---|---|---|
| *H04L 1/00* | (2006.01) | |
| *H04L 5/00* | (2006.01) | |
| *H04W 72/00* | (2009.01) | |

(52) U.S. Cl.
CPC ........ *H04L 5/0023* (2013.01); *H04L 27/2602* (2013.01); *H04L 27/2611* (2013.01); *H04L 27/2647* (2013.01); *H04L 27/2655* (2013.01); *H04L 27/2665* (2013.01); *H04W 72/005* (2013.01); *H04L 27/2607* (2013.01); *H04L 27/2613* (2013.01)

(58) Field of Classification Search
CPC ... H04L 27/2675; H04L 27/261; H04L 27/38; H04L 27/14; H04L 27/2601; H04L 1/0045; H04L 1/0042; H04L 1/0083; H04L 1/00; H04L 1/0072; H04L 1/0091; H04L 1/0631; H04L 5/0007; H04L 5/0048; H04L 12/18; H04L 65/4076; H04B 21/4348; H04B 21/4347; H04B 21/2362; H04B 21/4345; H04B 1/16
USPC ........ 375/340, 259, 260, 285, 316, 346, 349
See application file for complete search history.

(56) References Cited

U.S. PATENT DOCUMENTS

| | | | | |
|---|---|---|---|---|
| 2011/0002422 | A1* | 1/2011 | Cheng | H04L 27/2659 375/343 |
| 2011/0317790 | A1* | 12/2011 | Yokokawa | H04L 5/0048 375/329 |
| 2013/0114659 | A1 | 5/2013 | Murakami et al. | |
| 2013/0235952 | A1* | 9/2013 | Ko | H04H 20/42 375/295 |
| 2014/0161209 | A1* | 6/2014 | Limberg | H04L 5/0016 375/299 |
| 2015/0358648 | A1* | 12/2015 | Limberg | H04N 21/236 725/109 |

FOREIGN PATENT DOCUMENTS

| | | |
|---|---|---|
| JP | 2013/225755 A | 10/2013 |
| JP | 5358738 B2 | 12/2013 |
| WO | WO 2011/099741 A2 | 8/2011 |
| WO | 2012/067362 A2 | 5/2012 |

\* cited by examiner

FIG. 12

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 13

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
| FRU_PHY_PROFILE | 3 |
| FRU_FRAME_LENGTH | 2 |
| FRU_GI_FRACTION | 3 |
| RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |

| | |
|---|---|
| PLS2_REP_SIZE_CELL | 15 |
| PLS2_NEXT_FEC_TYPE | 2 |
| PLS2_NEXT_MOD | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC_32 | 32 |

FIG. 14

| Content | Bit |
|---|---|
| FIC_FLAG | 1 |
| AUX_FLAG | 1 |
| NUM_DP | 6 |
| for i = NUM_DP | |
| DP_ID | 6 |
| DP_TYPE | 3 |
| DP_GROUP_ID | 8 |
| BASE_DP_ID | 6 |
| DP_FEC_TYPE | 2 |
| DP_COD | 4 |
| DP_MOD | 4 |
| DP_SSD_FLAG | 1 |
| if PHY_PROFILE = '010' | |
| DP_MIMO | 3 |
| end | |
| DP_TI_TYPE | 1 |
| DP_TI_LENGTH | 2 |
| DP_TI_BYPASS | 1 |
| DP_FRAME_INTERVAL | 2 |
| DP_FIRST_FRAME_IDX | 5 |
| DP_NUM_BLOCK_MAX | 10 |
| DP_PAYLOAD_TYPE | 2 |
| DP_INBAND_MODE | 2 |
| DP_PROTOCOL_TYPE | 2 |
| DP_CRC_MODE | 2 |

| Content | Bit |
|---|---|
| if DP_PAYLOAD_TYPE==TS('00') | |
| DNP_MODE | 2 |
| ISSY_MODE | 2 |
| HC_MODE_TS | 2 |
| if HC_MODE_TS=='01' or '10' | |
| PID | 13 |
| end | |
| if DP_PAYLOAD_TYPE==IP('01') | |
| HC_MODE_IP | 2 |
| end | |
| RESERVED | 8 |
| end | |
| if FIC_FLAG == 1 | |
| FIC_VERSION | 8 |
| FIC_LENGTH_BYTE | 13 |
| RESERVED | 8 |
| end | |
| if AUX_FLAG == 1 | |
| NUM_AUX | 4 |
| AUX_CONFIG_RFU | 8 |
| for i=1:NUM_AUX | |
| AUX_STREAM_TYPE | 4 |
| AUX_PRIVATE_CONF | 28 |
| end | |
| end | |

FIG.15

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
|    DP_ID | 6 |
|    DP_START | 15 (or 13) |
|    DP_NUM_BLOCK | 10 |
|    RESERVED | 8 |
| end | |
| EAC_FLAG | 1 |
| EAS_WAKE_UP_VERSION_NUM | 8 |
| if EAC_FLAG == 1 | |
|    EAC_LENGTH_BYTE | 12 |
| else | |
|    EAC_COUNTER | 12 |
| end | |
| for i = 1:NUM_AUX | |
|    AUX_PRIVATE_DYN | 48 |
| end | |
| CRC_32 | 32 |

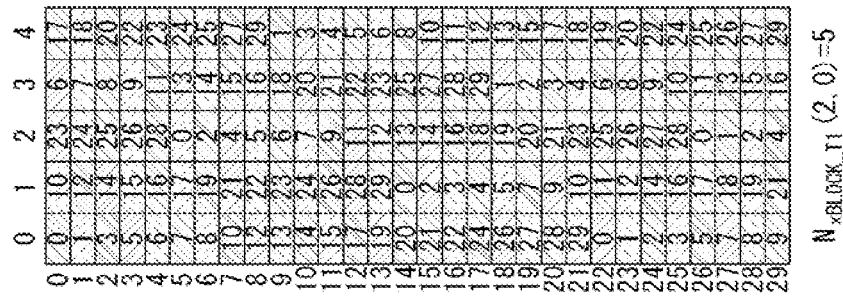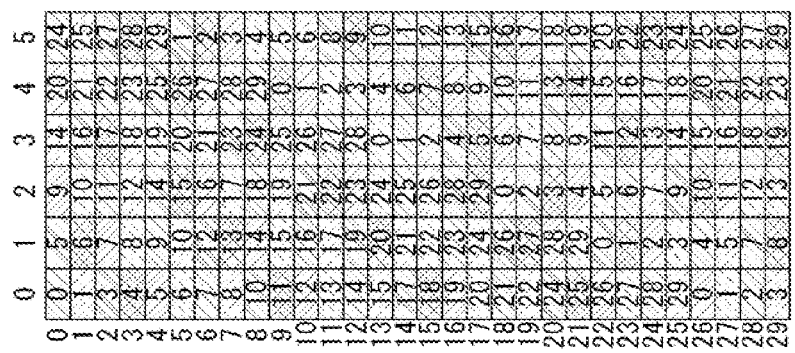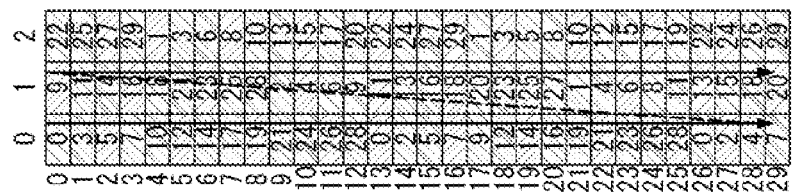
FIG. 29

FIG. 33

| | NoC | | | Estimated Number of CPs | | |
|---|---|---|---|---|---|---|
| K | 8K FFT | 16K FFT | 32K FFT | 8K FFT | 16K FFT | 32K FFT |
| 0 | 6913 | 13825 | 27649 | 48 | 96 | 192 |
| 1 | 6817 | 13633 | 27265 | 48 | 96 | 192 |
| 2 | 6721 | 13441 | 26881 | 47 | 93 | 186 |
| 3 | 6625 | 13249 | 26497 | 46 | 92 | 184 |
| 4 | 6529 | 13057 | 26113 | 45 | 90 | 180 |

■ SP
■ SP-bearing CPs $MOD(NoC - 1, Dx * Dy) = 0 \rightarrow 1$ SP-bearing CP for k=0, 2, 4

$MOD(NoC - 1, Dx * Dy) = 32 \rightarrow 0$ SP-bearing CP for k=1, 3 carrier index

A multiple of Dx*Dy      Max(Dx)=96

| K | NoC | | | SP32-2 MOD(NoC-1, 32*2) | | | SP16-4 MOD(NoC-1, 16*4) | | | SP32-4 MOD(NoC-1, 32*4) | | |
|---|---|---|---|---|---|---|---|---|---|---|---|---|
|  | 8K | 16K | 32K | 8K | 16K | 32K | 8K | 16K | 32K | 8K | 16K | 32K |
| 0 | 6913 | 13825 | 27649 | 0 | 0 | 0 | 0 | 0 | 0 | 0 | 0 | 0 |
| 1 | 6817 | 13633 | 27265 | 32 | 0 | 0 | 32 | 0 | 0 | 32 | 64 | 0 |
| 2 | 6721 | 13441 | 26881 | 0 | 0 | 0 | 0 | 0 | 0 | 64 | 0 | 0 |
| 3 | 6625 | 13249 | 26497 | 32 | 0 | 0 | 32 | 0 | 0 | 96 | 64 | 0 |
| 4 | 6529 | 13057 | 26113 | 0 | 0 | 0 | 0 | 0 | 0 | 0 | 0 | 0 |

■ SP
▨ SP-bearing CPs (Dx, Dy) = (32, 4)

carrier index

MOD(NoC − 1, Dx * Dy) = 0 → 3 SP-bearing CP for k=0, 2, 4
MOD(NoC − 1, Dx * Dy) = 64 → 1 SP-bearing CP for k=1, 3

A multiple of Dx*Dy

Max(Dx)*2 = 192

| k | NoC | | | SP32-2<br>MOD(NoC-1, 32*2) | | | SP16-4<br>MOD(NoC-1, 16*4) | | | SP32-4<br>MOD(NoC-1, 32*4) | | |
|---|---|---|---|---|---|---|---|---|---|---|---|---|
|   | 8K | 16K | 32K | 8K | 16K | 32K | 8K | 16K | 32K | 8K | 16K | 32K |
| 0 | 6913 | 13825 | 27649 | 0 | 0 | 0 | 0 | 0 | 0 | 0 | 0 | 0 |
| 1 | 6817 | 13633 | 27265 | 32 | 0 | 0 | 32 | 0 | 0 | 32 | 16 | 0 |
| 2 | 6721 | 13441 | 26881 | 0 | 0 | 0 | 0 | 0 | 0 | 64 | 0 | 0 |
| 3 | 6625 | 13249 | 26497 | 32 | 0 | 0 | 32 | 0 | 0 | 96 | 64 | 0 |
| 4 | 6529 | 13057 | 26113 | 0 | 0 | 0 | 0 | 0 | 0 | 0 | 0 | 0 |

FIG. 40

- $CP_{ref}$ = Only the first half of the $CP_{32k}$ value is saved at the receiver {101 125 269 437 629 669 765 1133 1245 1253 1269 1349 1781 1821 1845 2253 2405 2589 2685 2733
2909 3053 3093 3357 3477 3597 3957 3981 4341 4373 4437 4581 4613 4685 4965 5045 5285 5333
5661 5733 5765 6045 6125 6237 6485 6509 6869 6893 6957 7133 7205 7341 7517 7661 7701 8013
8213 8349 8429 8637 8909 8933 9005 9165 9245 9597 9645 9765 9989 10053 10109 10157 10685
10773 10805 10869 10965 10989 11037 11141 11565 11693 11741 12077 12261 12453 12461 12573
12981 13077 13221 13245 13469 13493 13581 13733}

Reversal (mirroring) and shift operation

- $CP_{32k}$ = {$CP_{ref}$, 27649 – $CP_{ref}$}
- $CP_{16k}$ = ceil((take every 2nd index of $CP_{32k}$)/2))
- $CP_{8k}$ = ceil((take every 4th index of $CP_{32k}$)/4))

FIG. 41

Only the first half of this value is saved at the receiver

[32K]
101 125 269 437 629 669 765 1133 1245 1253 1269 1349 1781 1821 1845 2253 2405 2589 2685 2733 2909 3053 3093 3357
2477 3597 2957 3981 4341 4273 4437 4581 4613 4685 4965 5045 5285 5333 5661 5733 5765 6045 6125 6237 6485 6509
6869 6893 6957 7133 7205 7241 7517 7661 7701 8013 8213 8349 8429 8637 8909 8933 9005 9165 9245 9597 9645 9765
9969 10053 10109 10157 10665 10773 10805 10869 10965 10989 11037 11141 11565 11693 11741 12077 12261 12453
12461 12573 12981 13077 13221 13245 13469 13493 13561 13733 13917 14069 14157 14181 14405 14429 14573 14669
15077 15189 15197 15389 15573 15909 15957 16085 16309 16357 16509 16613 16661 16685 16761 16845 16877 17493 17541
17597 17661 17885 18005 18053 18405 18485 18645 18717 19013 19221 19301 19437 19637 19849 19989 20133
20309 20445 20517 20693 20757 20781 21141 21165 21413 21525 21605 21693 21885 21917 21989 22317 22365 22685
22965 23037 23069 23213 23277 23309 23669 23693 24053 24173 24293 24557 24597 24741 24917 24965 25061 25245
25397 25805 25829 25869 26301 26381 26397 26405 26517 26885 26981 27021 27213 27381 27525 27549

Decimation by 2

[16K]
51 135 315 383 623 635 891 923 1203 1343 1455 1547 1739 1979 2171 2219 2307 2483 2643 2831 2883 3063 3243 3435
2479 3603 3759 3851 4107 4215 4455 4503 4623 4995 5055 5343 5403 5483 5519 5783 5871 6131 6231 6491 6611
6735 6791 6959 7079 7203 7287 7539 7787 7979 8255 8331 8391 8439 8747 8799 8943 9027 9243 9359 9507 9651
9819 9995 10155 10259 10379 10571 10707 10803 10959 11159 11303 11483 11535 11639 11835 12027 12147 12299
12459 12531 12699 12915 13151 13199 13259 13491 13607 13763

Decimation by 4

- Reference indices $CP_{32k,L} =$
| | | | | | | | |
|---|---|---|---|---|---|---|---|
| 236 | 316 | 356 | 412 | 668 | 716 | 868 | 1100 |
| 1228 | 1268 | 1340 | 1396 | 1876 | 1916 | 2140 | 2236 |
| 2548 | 2644 | 2716 | 2860 | 3004 | 3164 | 3236 | 3436 |
| 3460 | 3700 | 3836 | 4028 | 4124 | 4132 | 4156 | 4316 |
| 4636 | 5012 | 5132 | 5140 | 5332 | 5372 | 5500 | 5524 |
| 5788 | 6004 | 6020 | 6092 | 6428 | 6452 | 6500 | 6740 |
| 7244 | 7316 | 7372 | 7444 | 7772 | 7844 | 7924 | 8020 |
| 8164 | 8308 | 8332 | 8348 | 8788 | 8804 | 9116 | 9140 |
| 9292 | 9412 | 9436 | 9604 | 10076 | 10204 | 10340 | 10348 |
| 10420 | 10660 | 10684 | 10708 | 11068 | 11132 | 11228 | 11356 |
| 11852 | 11860 | 11884 | 12044 | 12116 | 12164 | 12268 | 12316 |
| 12700 | 12772 | 12820 | 12988 | 13300 | 13340 | 13564 | 13780 |

$CP_{32k,R} = 27648 - CP_{32k,L}$

- 32K CP indices
    $CP_{32k} = [CP_{32k,L} \ CP_{32k,R}]$

- 16K/8K CP indices
    $CP_{16k} = \text{ceil}((\text{take every 2nd index of } CP_{32k})/2))$
    $CP_{8k} = \text{ceil}((\text{take every 4th index of } CP_{32k})/4))$

FIG. 43

- 32K FFT mode

| | | | | | | | |
|---|---|---|---|---|---|---|---|
| 236 | 316 | 356 | 412 | 668 | 716 | 868 | 1100 |
| 1228 | 1268 | 1340 | 1396 | 1876 | 1916 | 2140 | 2236 |
| 2548 | 2644 | 2716 | 2860 | 3004 | 3164 | 3236 | 3436 |
| 3460 | 3700 | 3836 | 4028 | 4124 | 4132 | 4156 | 4316 |
| 4636 | 5012 | 5132 | 5140 | 5332 | 5372 | 5500 | 5524 |
| 5788 | 6004 | 6020 | 6092 | 6428 | 6452 | 6500 | 6740 |
| 7244 | 7316 | 7372 | 7444 | 7772 | 7844 | 7924 | 8020 |
| 8164 | 8308 | 8332 | 8348 | 8788 | 8804 | 9116 | 9140 |
| 9292 | 9412 | 9436 | 9604 | 10076 | 10204 | 10340 | 10348 |
| 10420 | 10660 | 10684 | 10708 | 11068 | 11132 | 11228 | 11356 |
| 11852 | 11860 | 11884 | 12044 | 12116 | 12164 | 12268 | 12316 |
| 12700 | 12772 | 12820 | 12988 | 13300 | 13340 | 13564 | 13780 |
| 13868 | 14084 | 14308 | 14348 | 14660 | 14828 | 14876 | 14948 |
| 15332 | 15380 | 15484 | 15532 | 15604 | 15764 | 15788 | 15796 |
| 16292 | 16420 | 16516 | 16580 | 16940 | 16964 | 16988 | 17228 |
| 17300 | 17308 | 17444 | 17572 | 18044 | 18212 | 18236 | 18356 |
| 18508 | 18532 | 18844 | 18860 | 19300 | 19316 | 19340 | 19484 |
| 19628 | 19724 | 19804 | 19876 | 20204 | 20276 | 20332 | 20404 |
| 20908 | 21148 | 21196 | 21220 | 21556 | 21628 | 21644 | 21860 |
| 22124 | 22148 | 22276 | 22316 | 22508 | 22516 | 22636 | 23012 |
| 23332 | 23492 | 23516 | 23524 | 23620 | 23812 | 23948 | 24188 |
| 24212 | 24412 | 24484 | 24644 | 24788 | 24932 | 25004 | 25100 |
| 25412 | 25508 | 25732 | 25772 | 26252 | 26308 | 26380 | 26420 |
| 26548 | 26780 | 26932 | 26980 | 27236 | 27292 | 27332 | 27412 |

FIG. 44

- 16K FFT mode

| | | | | | | | |
|---|---|---|---|---|---|---|---|
| 118 | 178 | 334 | 434 | 614 | 670 | 938 | 1070 |
| 1274 | 1358 | 1502 | 1618 | 1730 | 1918 | 2062 | 2078 |
| 2318 | 2566 | 2666 | 2750 | 2894 | 3010 | 3214 | 3250 |
| 3622 | 3686 | 3886 | 3962 | 4082 | 4166 | 4394 | 4558 |
| 4646 | 4718 | 5038 | 5170 | 5210 | 5342 | 5534 | 5614 |
| 5926 | 5942 | 6058 | 6134 | 6350 | 6410 | 6650 | 6782 |
| 6934 | 7154 | 7330 | 7438 | 7666 | 7742 | 7802 | 7894 |
| 8146 | 8258 | 8470 | 8494 | 8650 | 8722 | 9022 | 9118 |
| 9254 | 9422 | 9650 | 9670 | 9814 | 9902 | 10102 | 10166 |
| 10454 | 10598 | 10778 | 10822 | 11062 | 11138 | 11254 | 11318 |
| 11666 | 11758 | 11810 | 11974 | 12106 | 12242 | 12394 | 12502 |
| 12706 | 12866 | 13126 | 13190 | 13274 | 13466 | 13618 | 13666 |

FIG. 45

- 8K FFT mode

| | | | | | | | |
|---|---|---|---|---|---|---|---|
| 59 | 167 | 307 | 469 | 637 | 751 | 865 | 1031 |
| 1159 | 1333 | 1447 | 1607 | 1811 | 1943 | 2041 | 2197 |
| 2323 | 2519 | 2605 | 2767 | 2963 | 3029 | 3175 | 3325 |
| 3467 | 3665 | 3833 | 3901 | 4073 | 4235 | 4325 | 4511 |
| 4627 | 4825 | 4907 | 5051 | 5227 | 5389 | 5531 | 5627 |
| 5833 | 5905 | 6053 | 6197 | 6353 | 6563 | 6637 | 6809 |

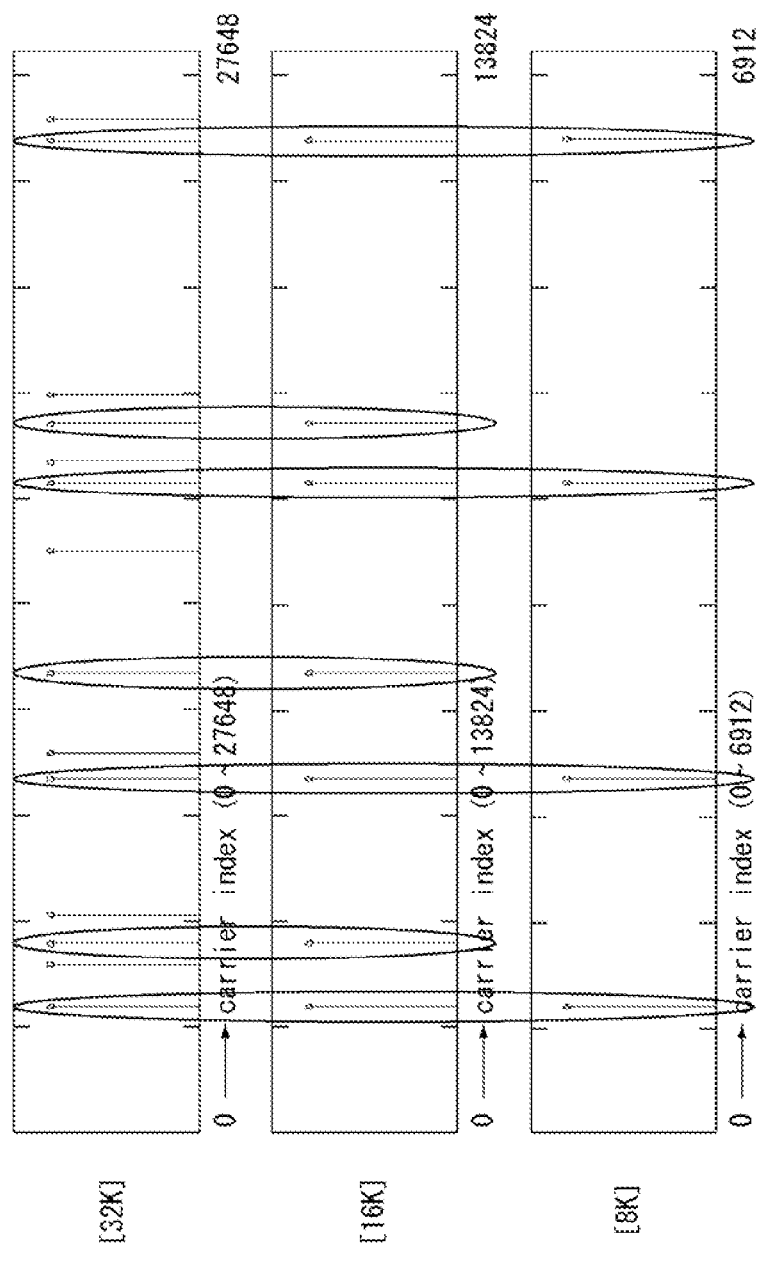

FIG. 52

| SP pattern | FFT mode | | |
|---|---|---|---|
| | 32K | 16K | 8K |
| SP32-4 | 6944<br>11584<br>22880 | 3488<br>(5824)<br>(11488) | (1696)*<br>(2880)<br>(5728)* |
| SP32-2 | 6944 | 3488 | (1696) |
| SP16-4 | 6928<br>11552<br>22896 | 3472<br>5792<br>11440 | 1744<br>(2912)<br>(5744) |
| SP16-2 | 6928 | 3472 | 1744 |
| SP8-4 | 6920<br>11536<br>22904 | 3464<br>5776<br>11448 | 1736<br>2896<br>5720 |
| SP8-2 | 6920 | 3464 | 1736 |
| SP4-4 | 6932<br>11560<br>22924 | 3460<br>5768<br>11452 | 1732<br>2888<br>5724 |
| SP4-2 | 6932 | 3460 | 1732 |

| SP pattern | FFT mode | | |
|---|---|---|---|
| | 32K | 16K | 8K |
| SP32-4 | 6936<br>11568<br>22920 | 3480<br>5808<br>11496 | 1752<br>2832<br>5736 |
| SP32-2 | 6936 | 3480 | 1752 |
| SP16-4 | 6924<br>11544<br>22932 | 3468<br>5784<br>11460 | 1740<br>2904<br>5748 |
| SP16-2 | 6924 | 3468 | 1740 |
| SP8-4 | 6942<br>11556<br>22938 | 3462<br>5772<br>11466 | 1734<br>2892<br>5730 |
| SP8-2 | 6942 | 3462 | 1734 |
| SP4-4 | 6939<br>11562<br>22929 | 3471<br>5778<br>11469 | 1731<br>2886<br>5733 |
| SP4-2 | 6939 | 3471 | 1731 |

| | k | | | |
|---|---|---|---|---|
| | 0, 4 | 1 | 2 | 3 |
| 8K FFT<br>SP32-4 | 1696<br>2880<br>5728 | 1696<br>2880 | 1696 | 1696<br>2880 |

( ) :not used if k mod 2 = 1      ( )* :not used if k mod 4 = 1
( )** :not used if k mod 4 = 1 or 2
( )*** :not used if k mod 4 = 1 or 2 or 3

$NoC = NoC_{Max} - K * \Delta$

APPARATUS AND METHOD FOR SENDING AND RECEIVING BROADCAST SIGNALS

CROSS-REFERENCE TO RELATED APPLICATIONS

This application claims the benefit under 35 U.S.C. §119(e) to U.S. Provisional Application No. 62/137,800 filed on Mar. 24, 2015, to U.S. Provisional Application No. 62/152,050 filed on Apr. 24, 2015, to U.S. Provisional Application No. 62/145,456 filed on Apr. 9, 2015, to U.S. Provisional Application No. 62/138,962 filed on Mar. 26, 2015, and to U.S. Provisional Application No. 62/142,487 filed on Apr. 3, 2015. The entire contents of all these applications are hereby incorporated by reference in its entirety.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

To solve the technical problems above, a broadcast signal receiver according to one embodiment of the present invention comprises a synchronization/demodulation module configured to perform signal detection and Orthogonal Frequency Division Multiplexing (OFDM) demodulation on a received broadcast signal; a frame parsing module configured to derive service data by parsing a signal frame of the received broadcast signal; a demapping and decoding module configured to convert an input signal into bit domain and to perform deinterleaving; and an output processing module configured to receive service data and to output a data stream, wherein the synchronization/demodulation module further comprises a pilot signal detecting module configured to detect a pilot signal including Continual Pilots (CPs) and Scattered Pilots (SPs) from the received broadcast signal, the CP is included in every symbol of a signal frame, and the locations and the number of the CPs are determined based on FFT (Fast Fourier Transform) size.

In a broadcast signal receiver according to one embodiment of the present invention, the number of carriers included in the signal frame is reduced by units from a maximum number of carriers, the unit being obtained by multiplying a control unit value by a reducing coefficient, and the control unit value corresponds to the predetermined number of carriers which are determined based on the FFT size.

In a broadcast signal receiver according to one embodiment of the present invention, the control unit value corresponds to 96 when the FFT size is 8, 192 when the FFT size is 16 and 384 when the FFT size is 32.

In a broadcast signal receiver according to one embodiment of the present invention, the CPs include a common CP set and an additional CP set.

In a broadcast signal receiver according to one embodiment of the present invention, the common CP set includes a first CP set for 32K FFT mode, a second CP set for 16K FFT mode, and a third CP set for 8K FFT mode; and the first CP set, the second CP set, and the third CP set are generated by using a predetermined first reference CP set.

In a broadcast signal receiver according to one embodiment of the present invention, the first CP set is generated by adding a second reference CP set to the first reference CP set and the second reference CP set is generated by reversing and shifting the first reference CP set.

In a broadcast signal receiver according to one embodiment of the present invention, the second CP set is generated by deriving CPs of every second index from CPs included in the first CP set.

In a broadcast signal receiver according to one embodiment of the present invention, the third CP set is generated by deriving CPs of every fourth index from CPs included in the first CP set.

In a broadcast signal receiver according to one embodiment of the present invention, the additional CP set is added at carrier locations of both of CP and SP for ensuring a constant number of data carriers in every data symbol of the signal frame, and the additional CP set depends on SP pattern and the FFT size.

In a broadcast signal receiver according to one embodiment of the present invention, the number of carriers included in the signal frame is reduced by units from a maximum number of carriers, the unit being obtained by multiplying a control unit value by a reducing coefficient, and the control unit value corresponds to a predetermined number of carriers which are determined based on the FFT size, wherein the additional CP set for a specific SP pattern and a specific FFT size is added differently according to the reducing coefficient.

A method for receiving a broadcast signal of a broadcast signal receiver according to one embodiment of the present invention comprises performing signal detection and OFDM demodulation on a received broadcast signal; deriving service data by parsing a signal frame of the received broadcast signal; converting an input signal into bit domain and performing deinterleaving; and receiving service data and outputting a data stream, wherein the performing signal detection and OFDM demodulation further comprises detecting a pilot signal including Continual Pilots (CPs) and Scattered Pilots (SPs) from the received broadcast signal, the CP is included in every symbol of a signal frame, and the locations and the number of the CPs are determined based on FFT (Fast Fourier Transform) size.

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

Further aspects and effects of the present invention will be described more detail with embodiments in belows.

BRIEF DESCRIPTION OF THE DRAWINGS

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 29 illustrates XFECBLOCK interleaved from each interleaving array according to an exemplary embodiment of the present invention.

FIGS. 31 to 33 illustrate embodiments of a flexible NoC structure of a broadcast signal according to the present invention.

FIGS. 34 to 37 illustrate cases according to one embodiment of the present invention, where constraints are generated to maintain a constant NoA when NoC is changed according to FFT size.

FIGS. 40 and 41 illustrate a method for generating a reference CP set and generating a CP pattern using the reference CP set according to one embodiment of the present invention.

FIGS. 42 to 45 illustrate a method for generating a reference CP set and generating a CP pattern using the reference CP set according to another one embodiment of the present invention.

FIGS. 46 to 51 illustrate performance and distribution of CP sets shown in FIGS. 42 to 45.

FIG. 52 illustrates additional CP sets according to an embodiment of the present invention.

DETAILED DESCRIPTION OF THE EMBODIMENTS

Figure 1:
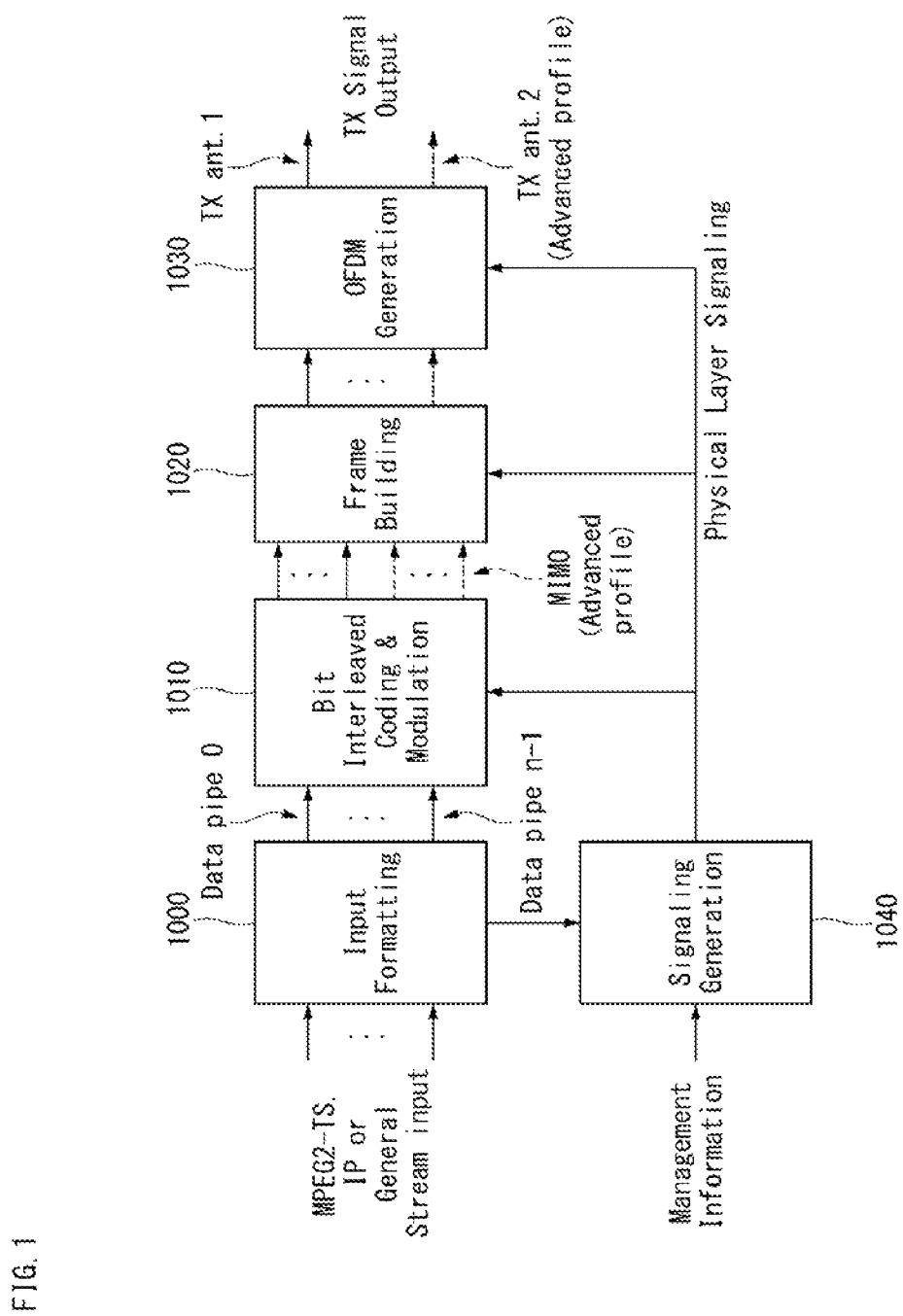
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings. Also, the term block and module are used similarly to indicate logical/functional unit of particular signal/data processing.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| LDPC codeword length | 16K, 64K bits |
| Constellation size | 4~10 bpcu (bits per channel use) |

TABLE 1-continued

| Time de-interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| LDPC codeword length | 16 Kbits |
| Constellation size | 2~8 bpcu |
| Time de-interleaving memory size | $\leq 2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| LDPC codeword length | 16K, 64K bits |
| Constellation size | 8~12 bpcu |
| Time de-interleaving memory size | $\leq 2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot (sp) pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
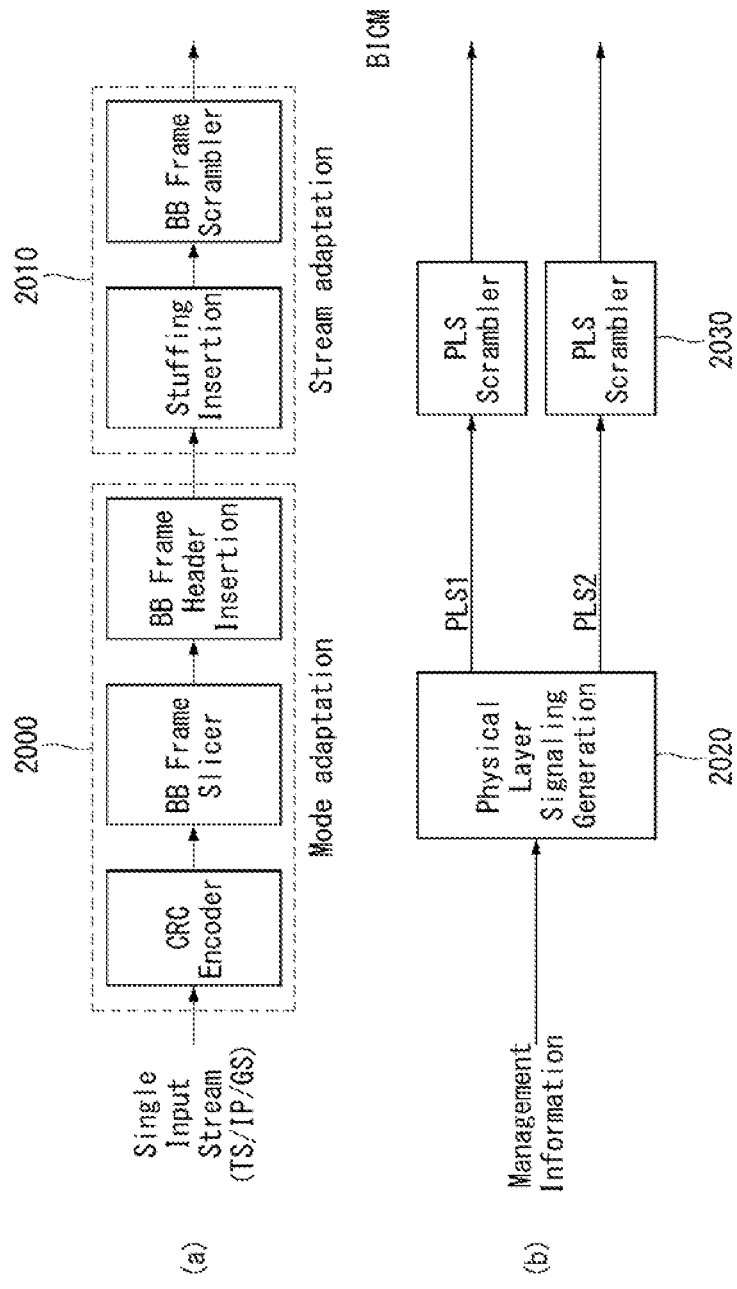
FIG. 2 illustrates an input formatting block according to one embodiment of the present invention.
Figure 3:
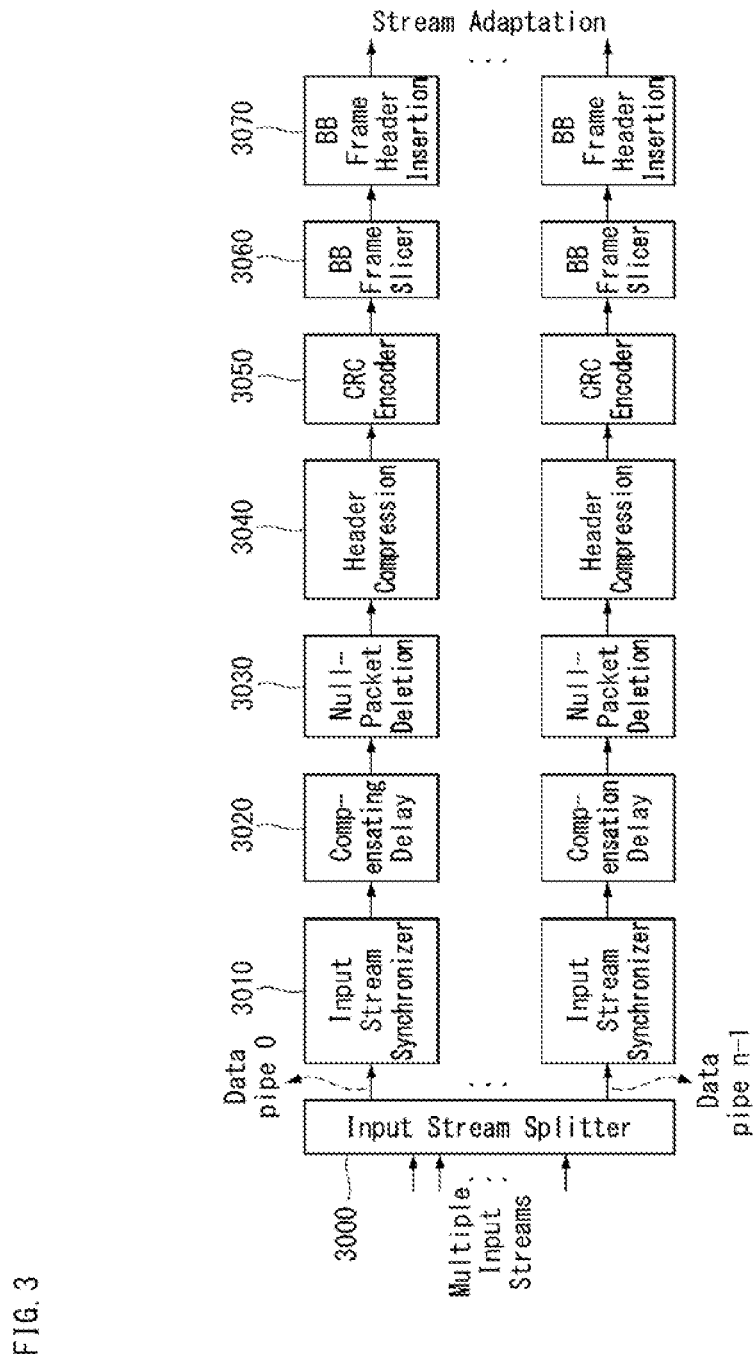
FIG. 3 illustrates an input formatting block according to another embodiment of the present invention.
Figure 4:
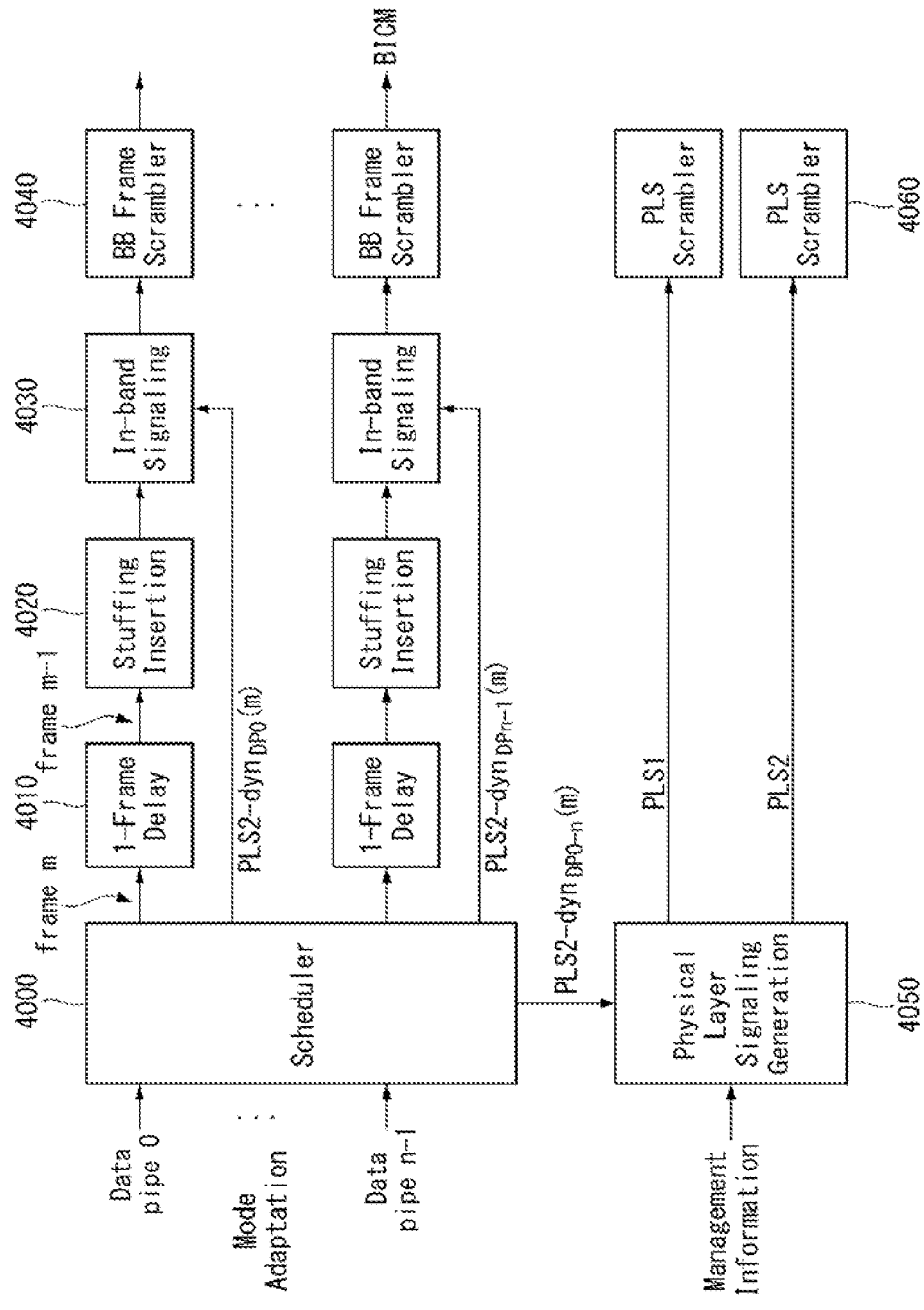
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feed-back shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
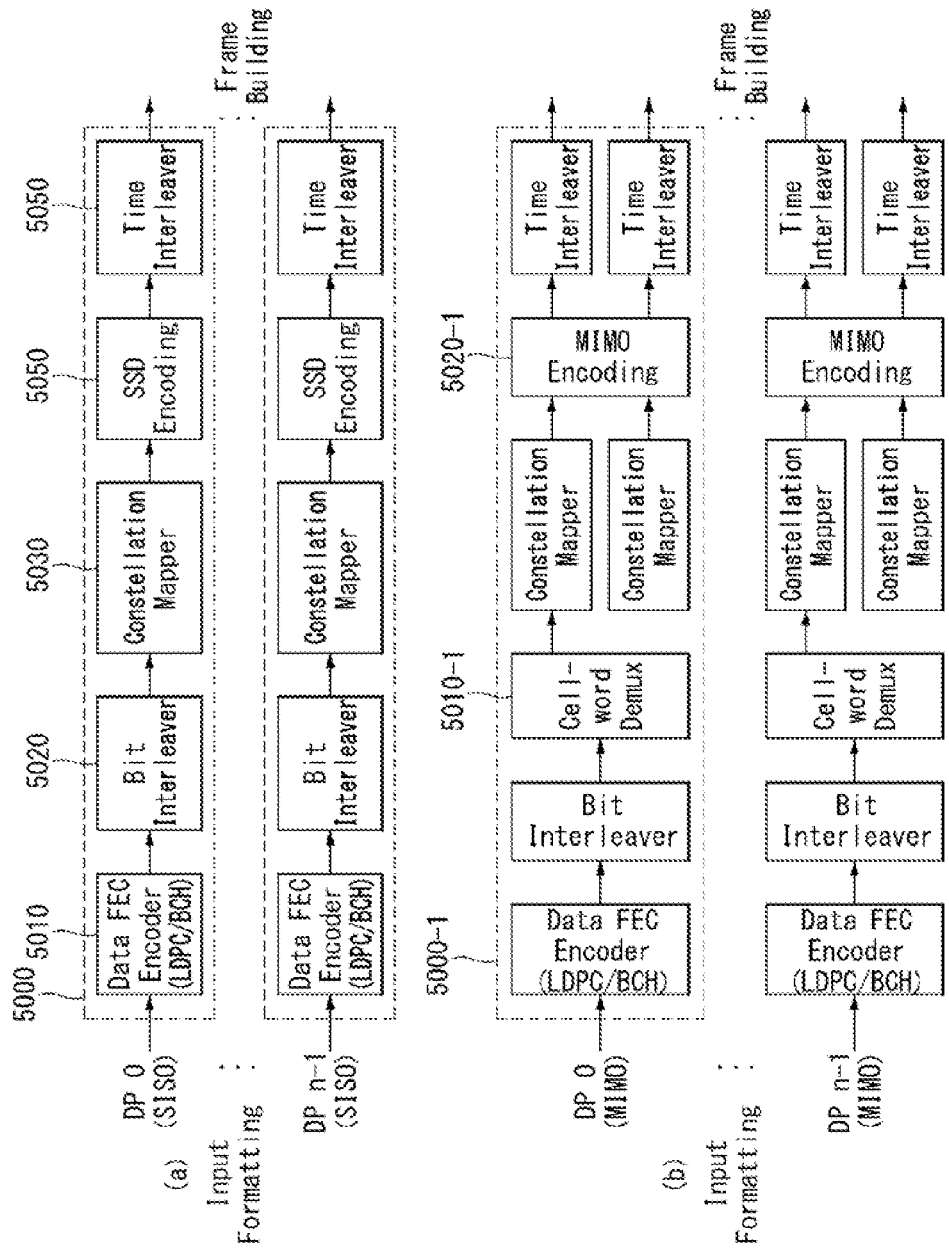
FIG. 5 illustrates a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data. FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 6:
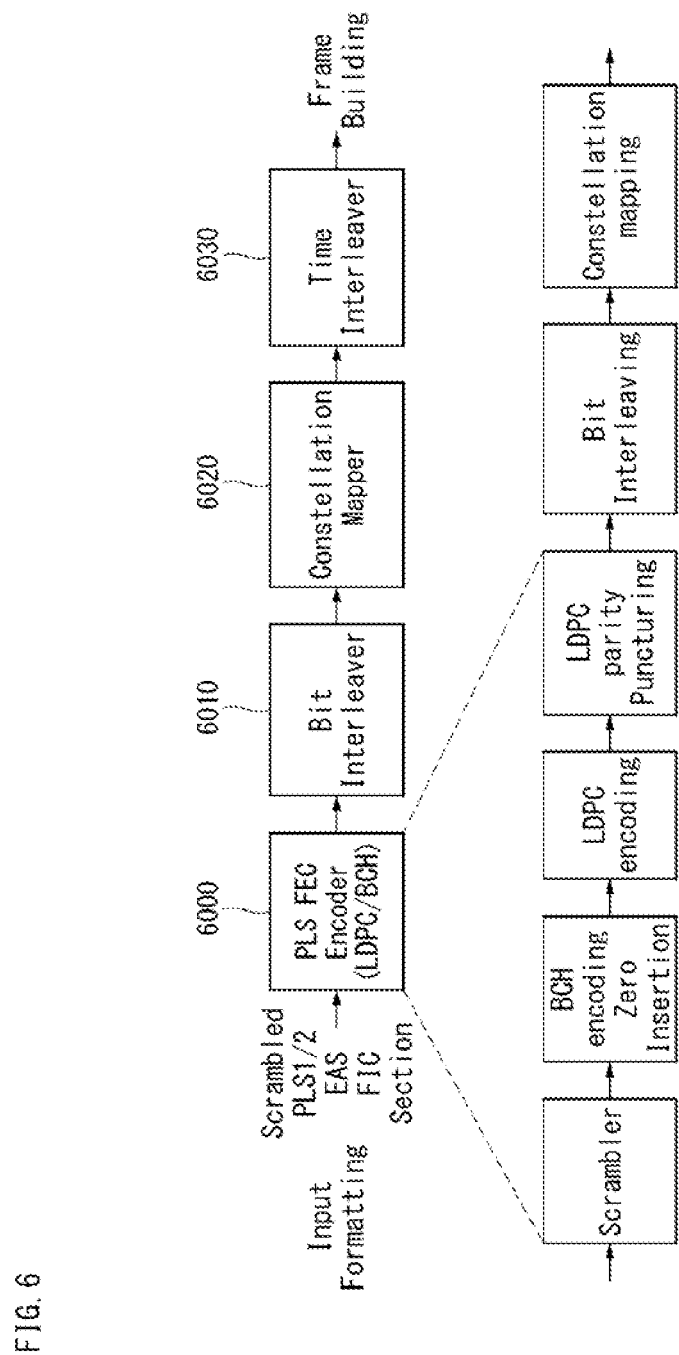
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permuted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Equation 1]

The LDPC code parameters for PLS1 and PLS2 are as following table 4.

TABLE 4

| Signaling Type | Ksig | Kbch | Nbch_parity | Kldpc (=Nbch) | Nldpc | Nldpc_parity | code rate | Qldpc |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The time interleaver 6030 can interleave the mapped PLS1 data and PLS2 data.

The above-described blocks may be omitted or replaced by blocks having similar or identical functions.

Figure 7:
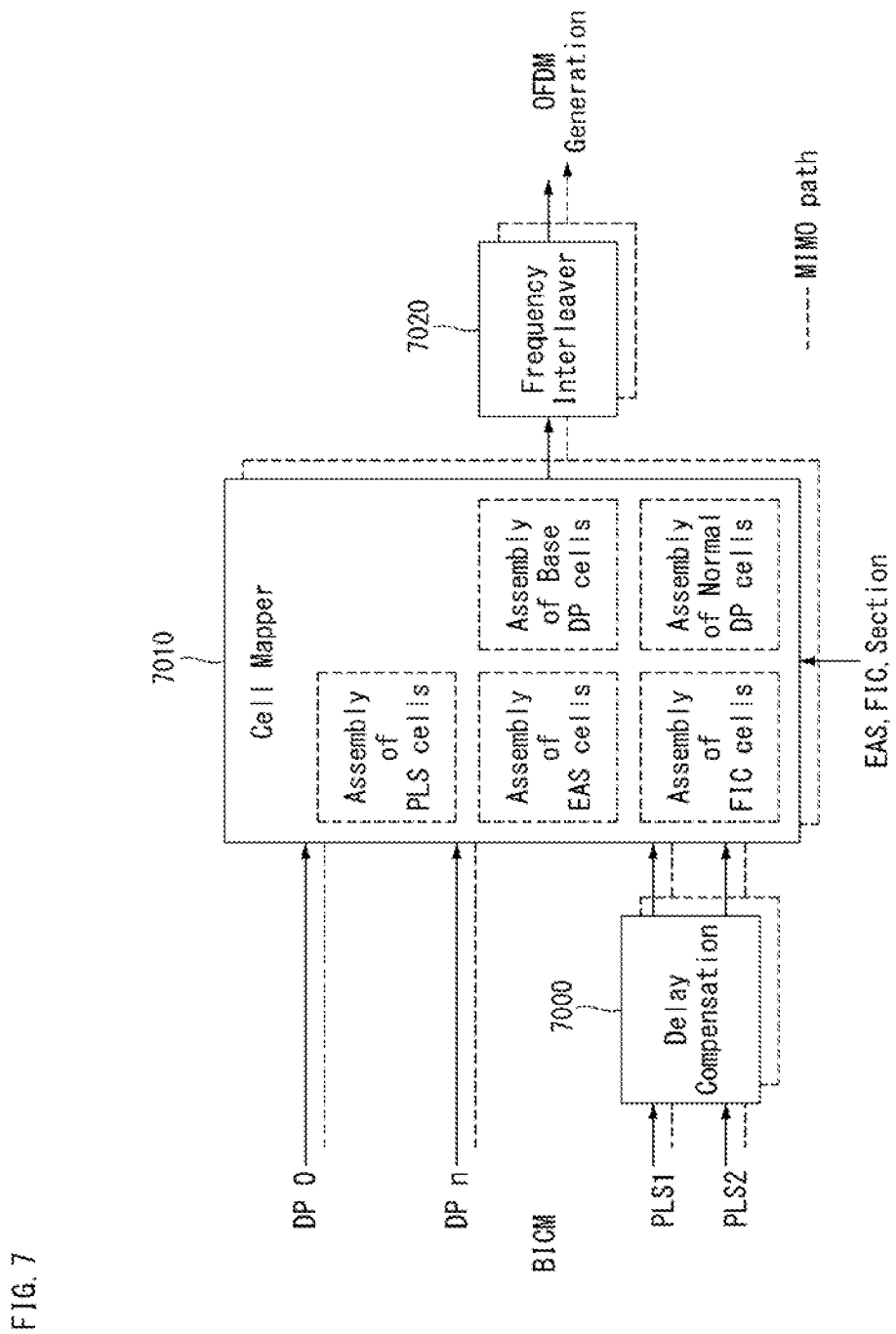
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

Figure 8:
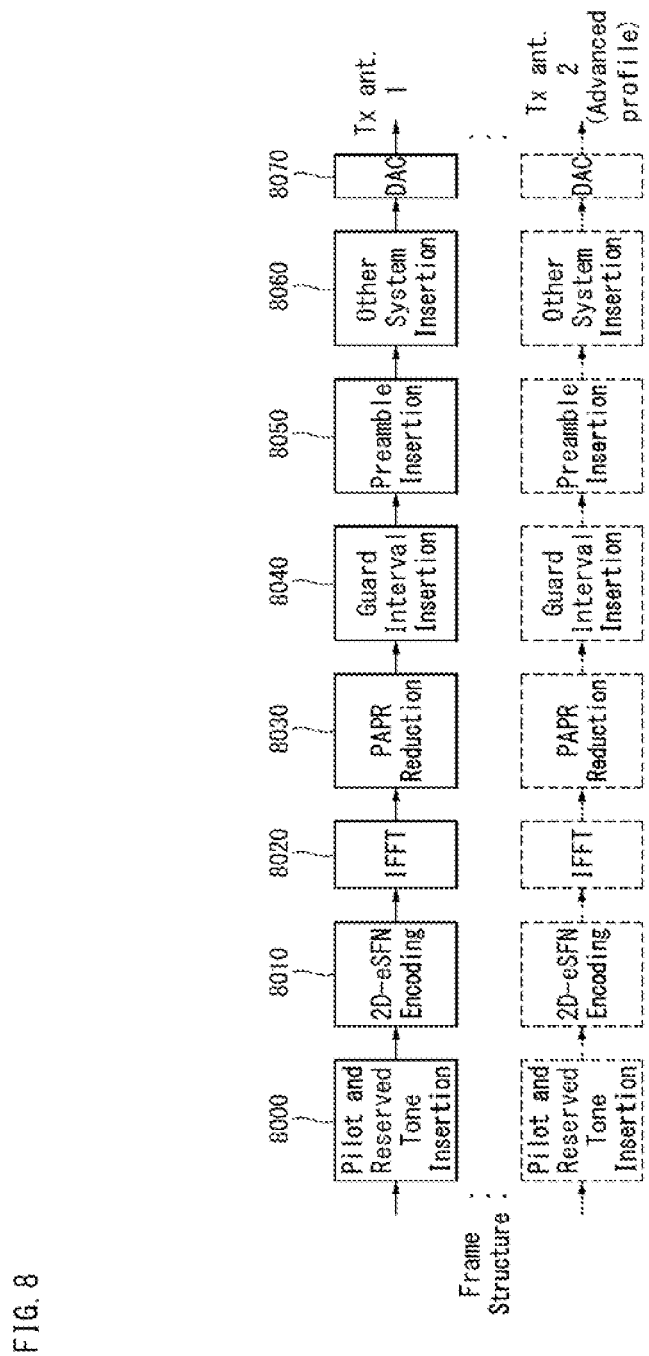
FIG. 8 illustrates an OFDM generation block according to an embodiment of the present invention.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots (SP), continual pilots (CP), edge pilots (EP), FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration.

Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
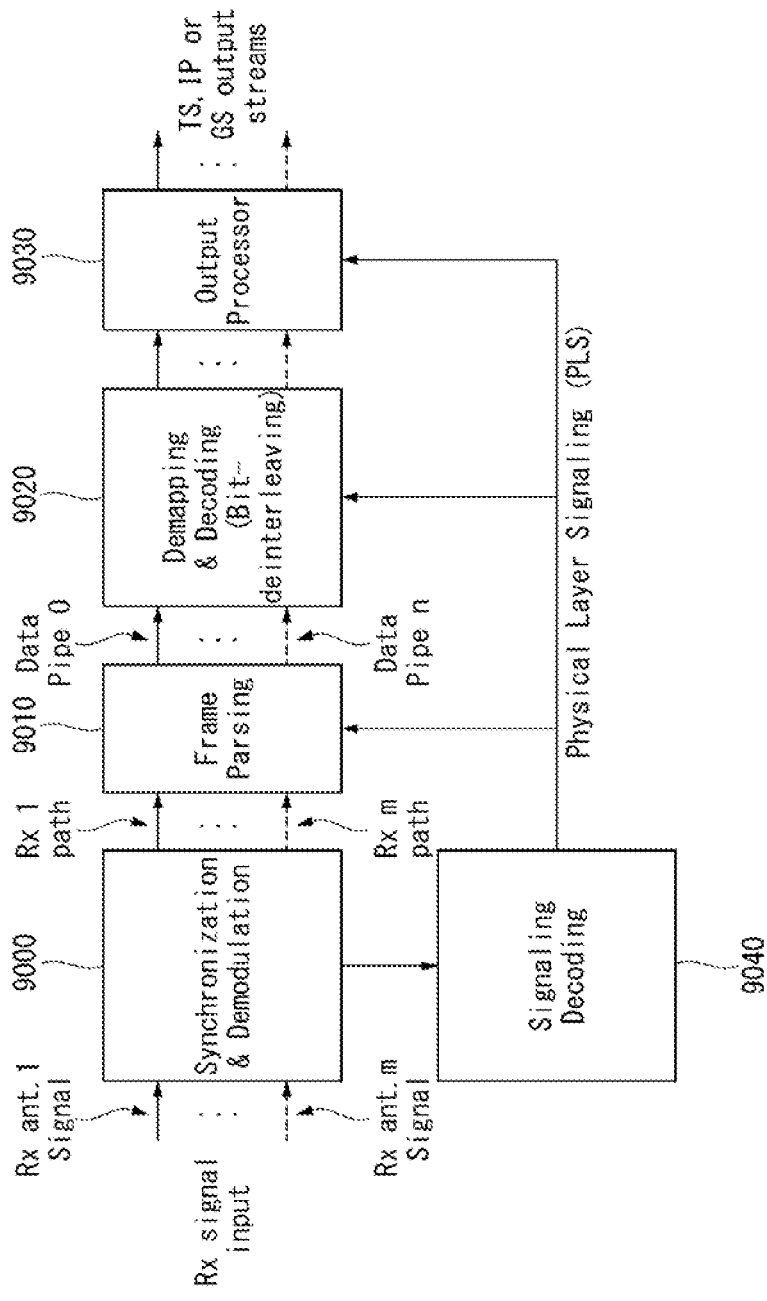
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and perform demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can perform deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 9030 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figure 10:
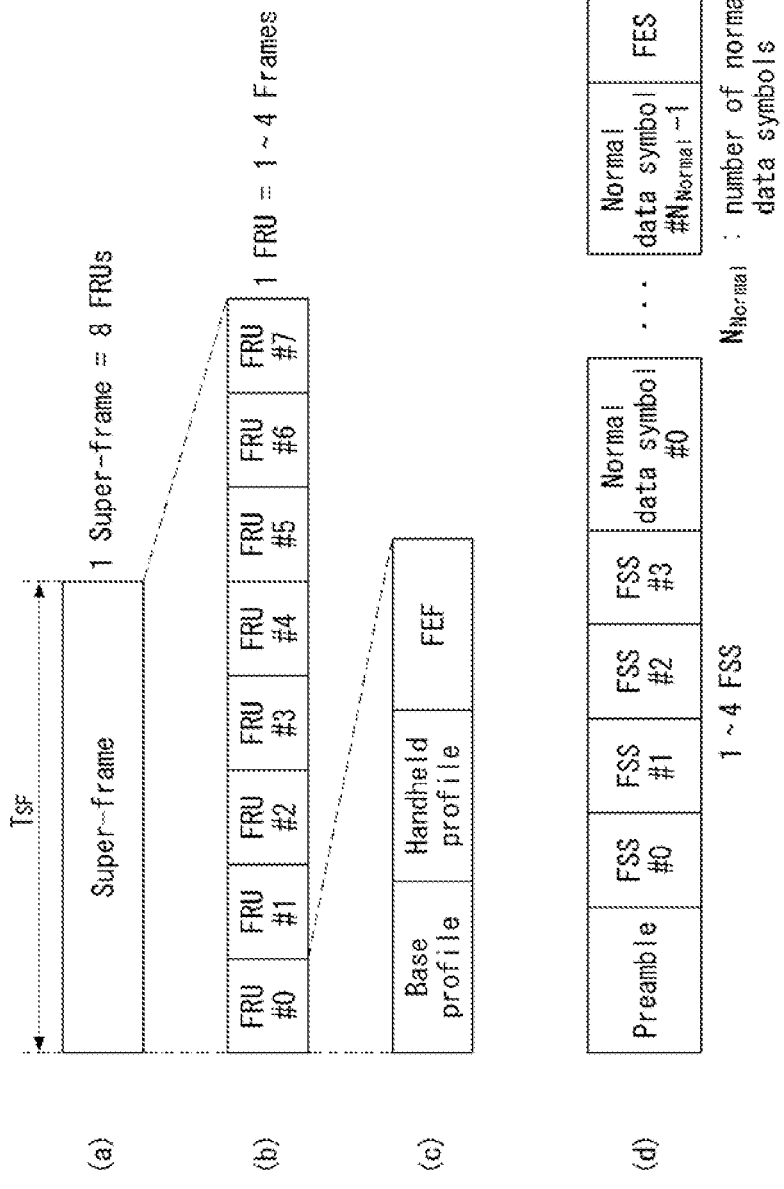
FIG. 10 illustrates a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figure 11:
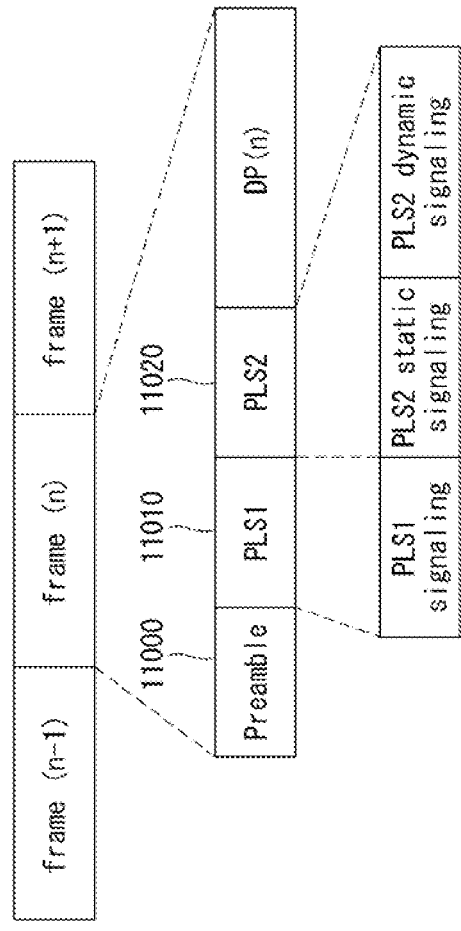
FIG. 11 illustrates a signaling hierarchy structure of the frame according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
| --- | --- |
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
| --- | --- |
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
| --- | --- |
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

|  | Current PHY_PROFILE = '000' (base) | Current PHY_PROFILE = '001' (handheld) | Current PHY_PROFILE = '010' (advanced) | Current PHY_PROFILE = '111' (FEF) |
| --- | --- | --- | --- | --- |
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| Value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Contents | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This field 14-bit indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |

TABLE 16-continued

| Value | Modulation |
| --- | --- |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (Pi=1). The allowed PI values with 2-bit field are defined in the below table 18.

TABLE 18

| 2-bit field | PI | NTI |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
| --- | --- | --- | --- |
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bits | 15 bits |
| Handheld | — | 13 bits |
| Advanced | 13 bits | 15 bits |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

Figure 16:
FIG. 16 illustrates a logical structure of a frame according to an embodiment of the present invention.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
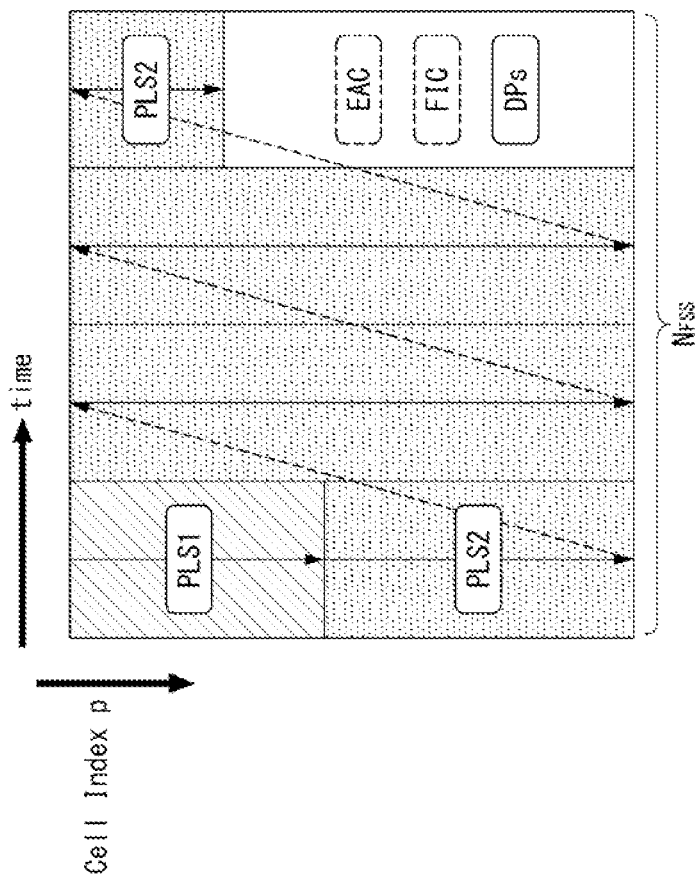
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) N_FSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
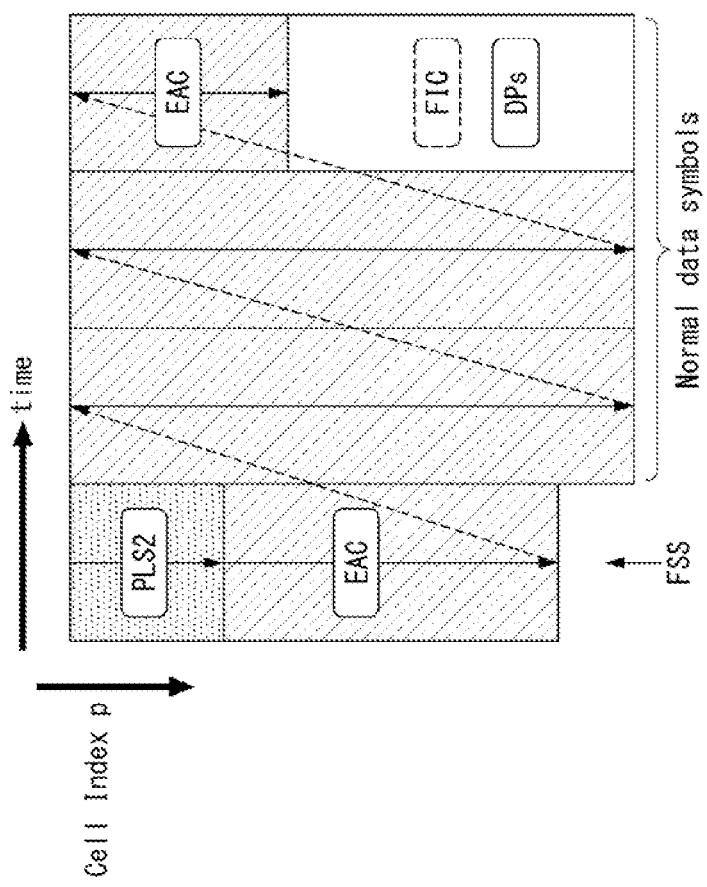
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19:
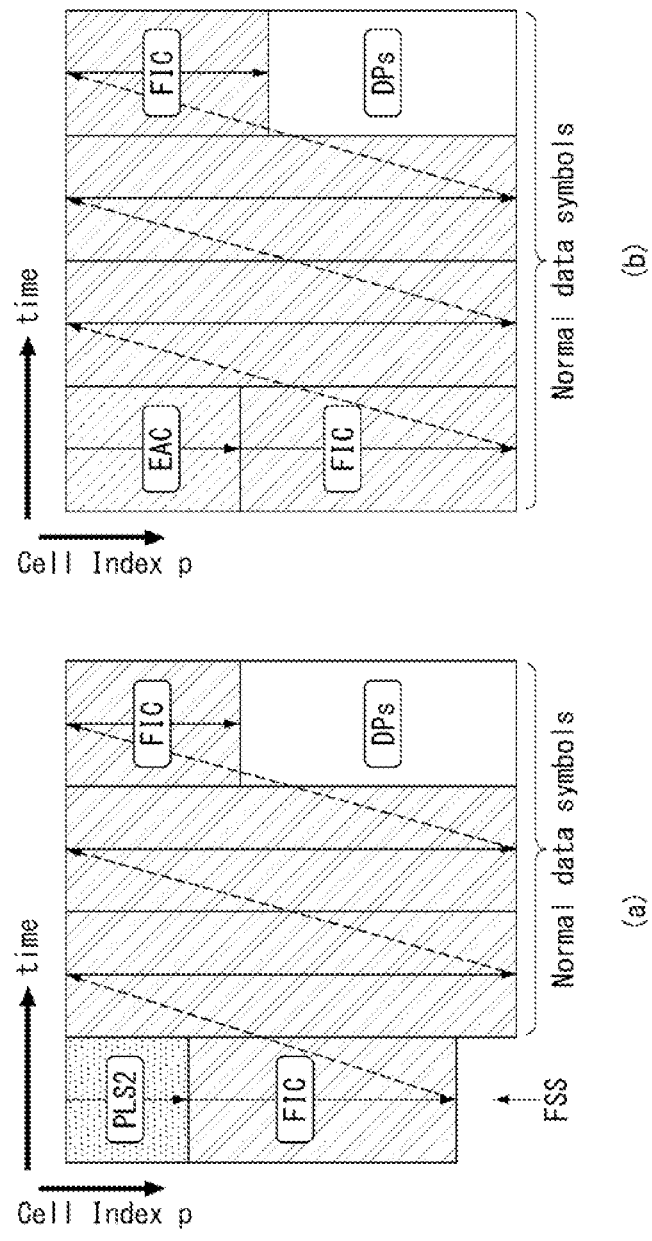
FIG. 19 illustrates FIC mapping according to an embodiment of the present invention.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
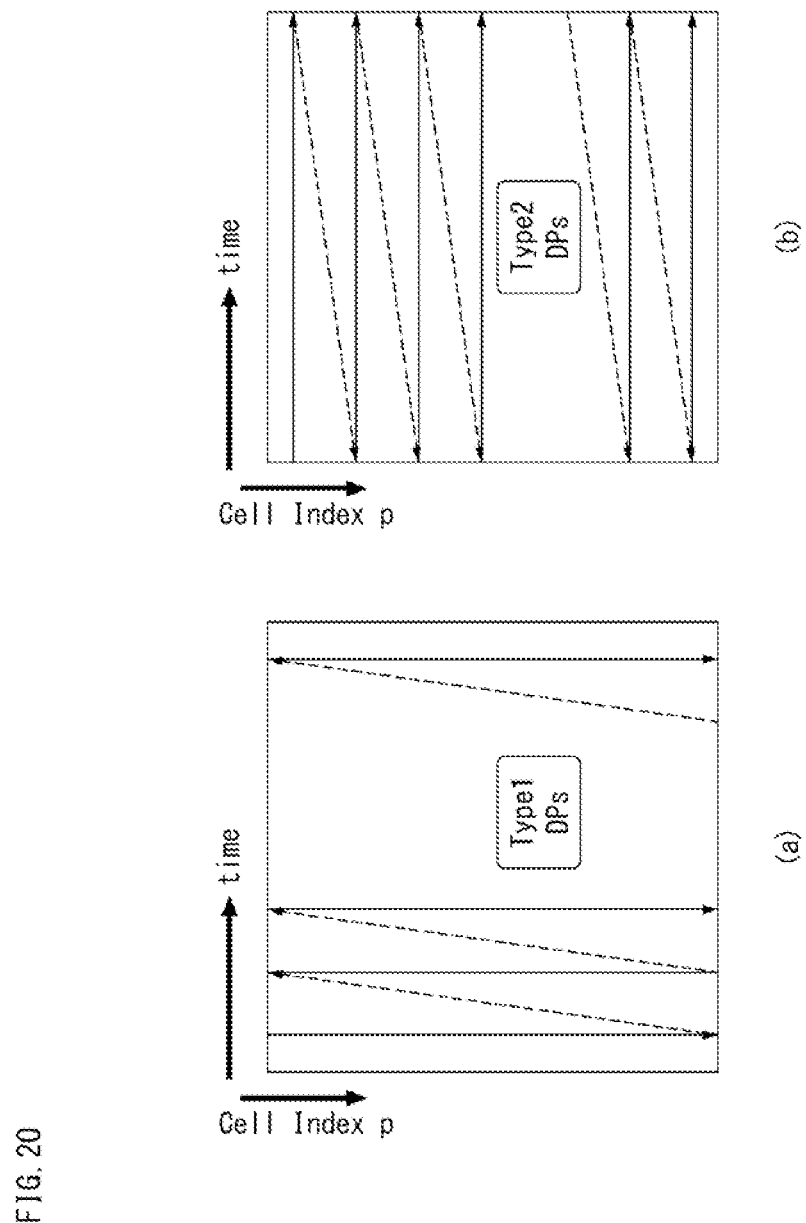
FIG. 20 illustrates a type of DP according to an embodiment of the present invention.

FIG. 20 illustrates a type of DP according to an embodiment of the present invention.

shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Equation 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21:
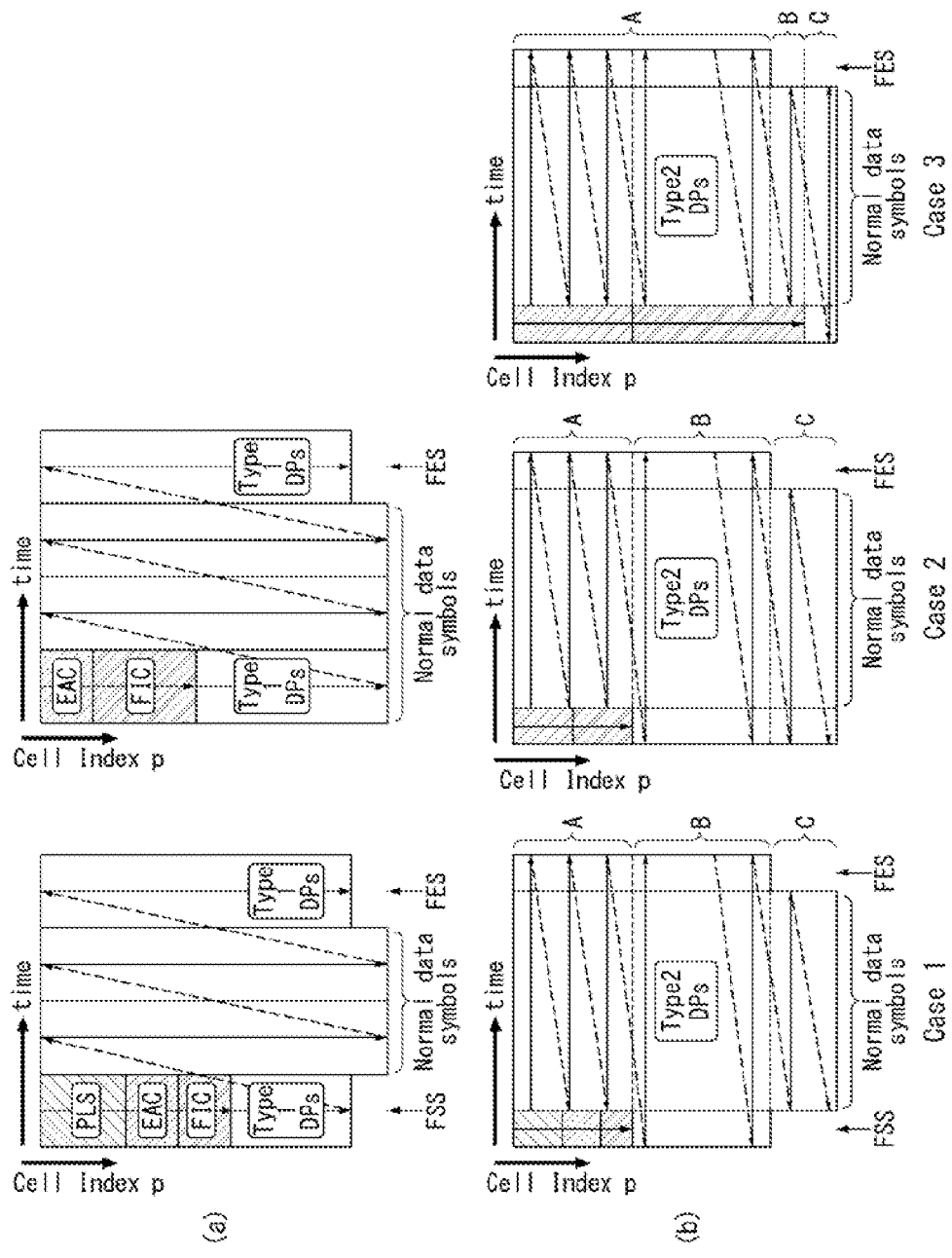
FIG. 21 illustrates DP mapping according to an embodiment of the present invention.

FIG. 21 illustrates DP mapping according to an embodiment of the present invention.

shows an addressing of OFDM cells for mapping type 1 DPs and (b) shows an addressing of OFDM cells for mapping for type 2 DPs.

Addressing of OFDM cells for mapping Type 1 DPs (0, . . . , DDP1-1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2-1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

Figure 22:
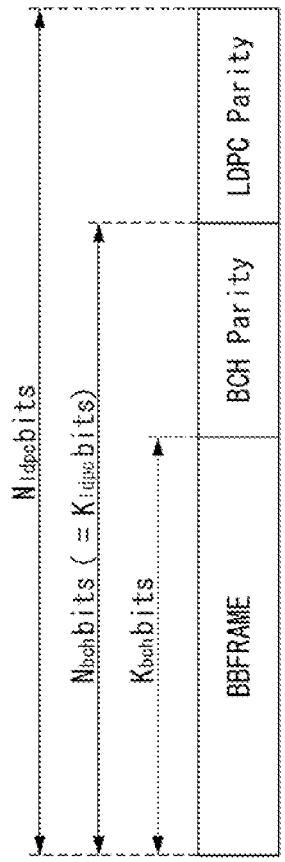
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | Nldpc | Kldpc | Kbch | BCH error correction capability | Nbch − Kbch |
|---|---|---|---|---|---|
| 5/15 | 64800 | 21600 | 21408 | 12 | 192 |
| 6/15 | | 25920 | 25728 | | |
| 7/15 | | 30240 | 30048 | | |

TABLE 28-continued

| LDPC Rate | Nldpc | Kldpc | Kbch | BCH error correction capability | Nbch – Kbch |
|---|---|---|---|---|---|
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | Nldpc | Kldpc | Kbch | BCH error correction capability | Nbch – Kbch |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Equation.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Equation 3]

The parameters for long FECBLOCK and short FEC-BLOCK are given in the above table 28 and 29, respectively.

The detailed procedure to calculate Nldpc−Kldpc parity bits for long FECBLOCK, is as follows:

1) Initialize the parity bits, $$p_0 = p_1 = p_2 = \ldots = p_{N_{ldpc}-K_{ldpc}-1} = 0$$ [Equation 3]

2) Accumulate the first information bit—i0, at parity bit addresses specified in the first row of an addresses of parity check matrix. The details of addresses of parity check matrix will be described later. For example, for rate 13/15:

$$p_{983} = p_{983} \oplus i_0 \quad p_{2815} = p_{2815} \oplus i_0$$

$$p_{4837} = p_{4837} \oplus i_0 \quad p_{4989} = p_{4989} \oplus i_0$$

$$p_{6138} = p_{6138} \oplus i_0 \quad p_{6458} = p_{6458} \oplus i_0$$

$$p_{6921} = p_{6921} \oplus i_0 \quad p_{6974} = p_{6974} \oplus i_0$$

$$p_{7572} = p_{7572} \oplus i_0 \quad p_{8260} = p_{8260} i \oplus i_0$$

$$p_{8496} = p_{8496} \oplus i_0$$ [Equation 5]

3) For the next 359 information bits, is, s=1, 2, . . . , 359 accumulate is at parity bit addresses using following Equation.

$$\{x + (s \bmod 360) \times Q_{ldpc}\} \bmod (N_{ldpc} - K_{ldpc})$$ [Equation 6]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_0 \quad p_{2839} = p_{2839} \oplus i_1$$

$$p_{4861} = p_{4861} \oplus i_1 \quad p_{5013} = p_{5013} \oplus i_1$$

$$p_{6162} = p_{6162} \oplus i_1 \quad p_{6482} = p_{6482} \oplus i_1$$

$$p_{6945} = p_{6945} \oplus i_1 \quad p_{6998} = p_{6998} \oplus i_1$$

$$p_{7596} = p_{7596} \oplus i_1 \quad p_{8284} = p_{8284} \oplus i_1$$

$$p_{8320} = p_{8520} \oplus i_1$$ [Equation 7]

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the Equation 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1,2, \ldots, N_{ldpc} - K_{ldpc} - 1$$ [Equation 8]

where final content of pi, i=0, 1, . . . Nldpc−Kldpc−1 is equal to the parity bit pi.

TABLE 30

| Code Rate | Qldpc |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | Qldpc |
|---|---|
| 5/15 | 30 |
| 6/15 | 27 |
| 7/15 | 24 |
| 8/15 | 21 |
| 9/15 | 18 |
| 10/15 | 15 |

TABLE 31-continued

| Code Rate | Qldpc |
|---|---|
| 11/15 | 12 |
| 12/15 | 9 |
| 13/15 | 6 |

Figure 23:
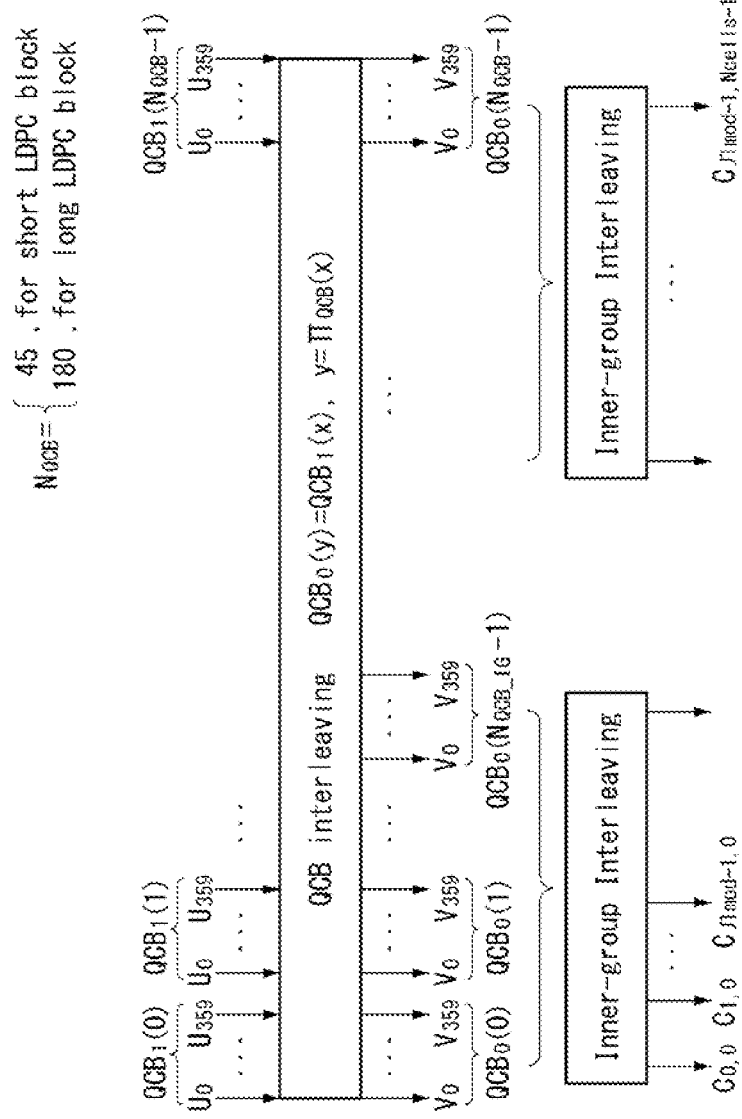
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/η mod or 16200/η mod according to the FECBLOCK length. The QCB interleaving pattern is unique to each combination of modulation type and LDPC code rate.

After QCB interleaving, inner-group interleaving is performed according to modulation type and order (η mod) which is defined in the below table 32. The number of QC blocks for one inner-group, NQCB_IG, is also defined.

TABLE 32

| Modulation type | ηmod | NQCB_IG |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24:
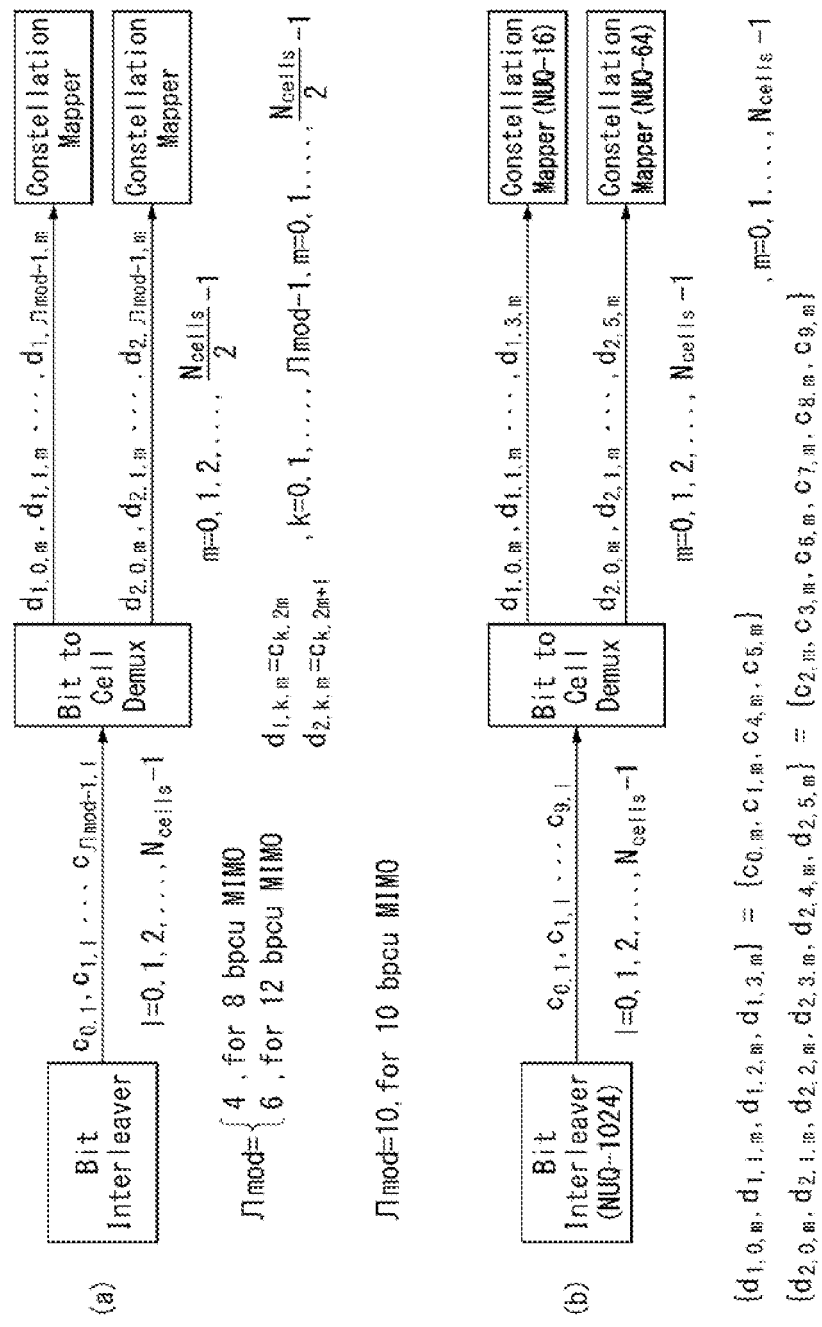
FIG. 24 illustrates a cell-word demultiplexing according to an embodiment of the present invention.

FIG. 24 illustrates a cell-word demultiplexing according to an embodiment of the present invention.

shows a cell-word demultiplexing for 8 and 12 bpcu MIMO and (b) shows a cell-word demultiplexing for 10 bpcu MIMO.

Each cell word (c0,l, c1,l, ..., cη mod−1,l) of the bit interleaving output is demultiplexed into (d1,0,m, d1,1,m ..., d1,η mod−1,m) and (d2,0,m, d2,1,m ..., d2,η mod−1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,l, c1,l, ..., c9,l) of the Bit Interleaver output is demultiplexed into (d1,0,m, d1,1,m ..., d1,3,m) and (d2,0,m, d2,1,m ..., d2,5,m), as shown in (b).

Figure 25:
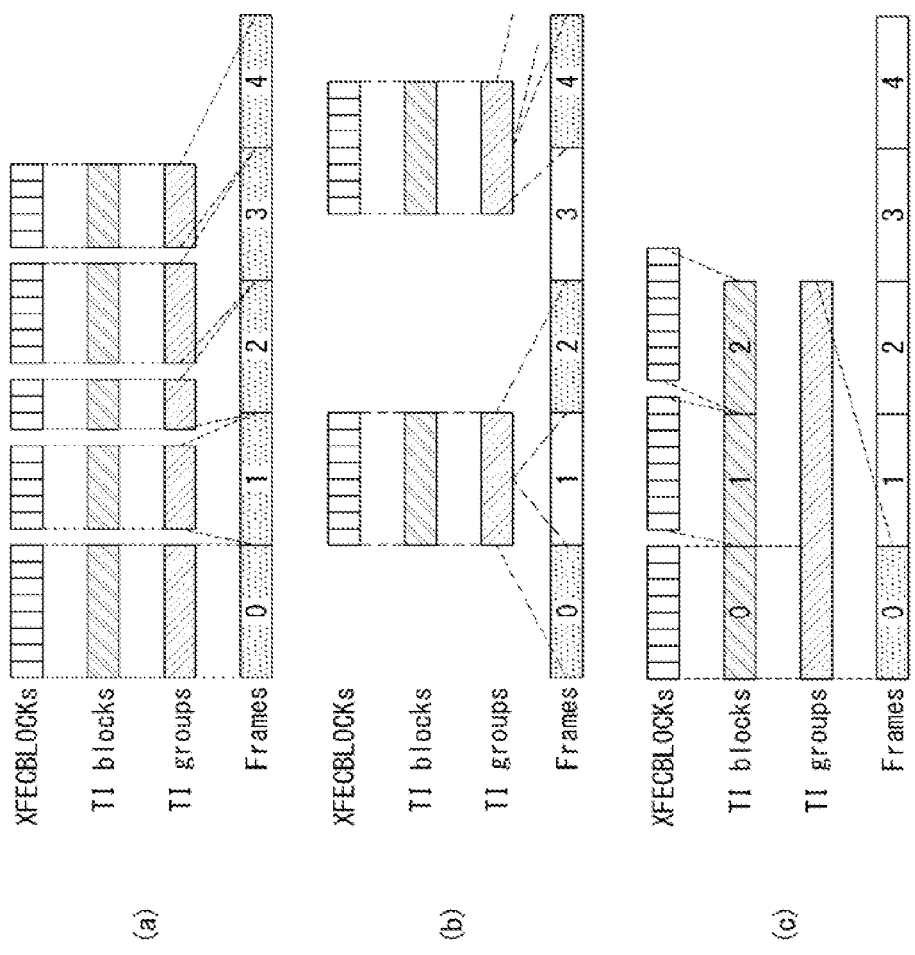
FIG. 25 illustrates a time interleaving according to an embodiment of the present invention.

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group(n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_B-LOCK_MAX) of which the largest value is 1023.

Each TI group is either mapped directly onto one frame or spread over PI frames. Each TI group is also divided into more than one TI blocks (NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Mode | Description |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while $P_I$ = 1. |

In each DP, the TI memory stores the input XFEC-BLOCKs (output XFECBLOCKs from the SSD/MIMO encoding block). Assume (that input XFECBLOCKs are defined as $$(d_{n,s,0,0}d_{n,s,0,1}, \ldots, d_{n,s,0,N_{cells}-1}, d_{n,s,1,0}, \ldots,$$
$$d_{n,s,1,N_{cells}-1}, \ldots, d_{n,s,N_{xBLOCK\_TI}(n,s)-1,0}, \ldots,$$
$$d_{n,s,N_{xBLOCK\_TI}(n,s)-1,N_{cells}-1})$$

where $d_{n,s,r,q}$ is the qth cell of the rth XFECBLOCK in the sth TI block of the nth TI group and represents the outputs of SSD and MIMO encodings as follows $$d_{n,s,r,q} = \begin{cases} f_{n,s,r,q} & \text{, the output of } SSD \ldots \text{ encoding} \\ g_{n,s,r,q} & \text{, the output of } MIMO \text{ encoding} \end{cases}.$$

In addition, assume that output XFECBLOCKs from the time interleaver 5050 are defined as $$(h_{n,s,0}, h_{n,s,1}, \ldots, h_{n,s,i}, \ldots, h_{n,s,N_{xBLOCK\_TI}(n,s) \times N_{cells}-1})$$

where $h_{n,s,i}$ is the ith output cell (for i=0, . . . , $N_{xBLOCK\_TI}(n,s) \times N_{cells}$ −1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$. i.e., $N_r = N_{cells}$ while the number of columns $N_c$ is equal to the number $N_{xBLOCK\_TI}(n,s)$.

Figure 26:
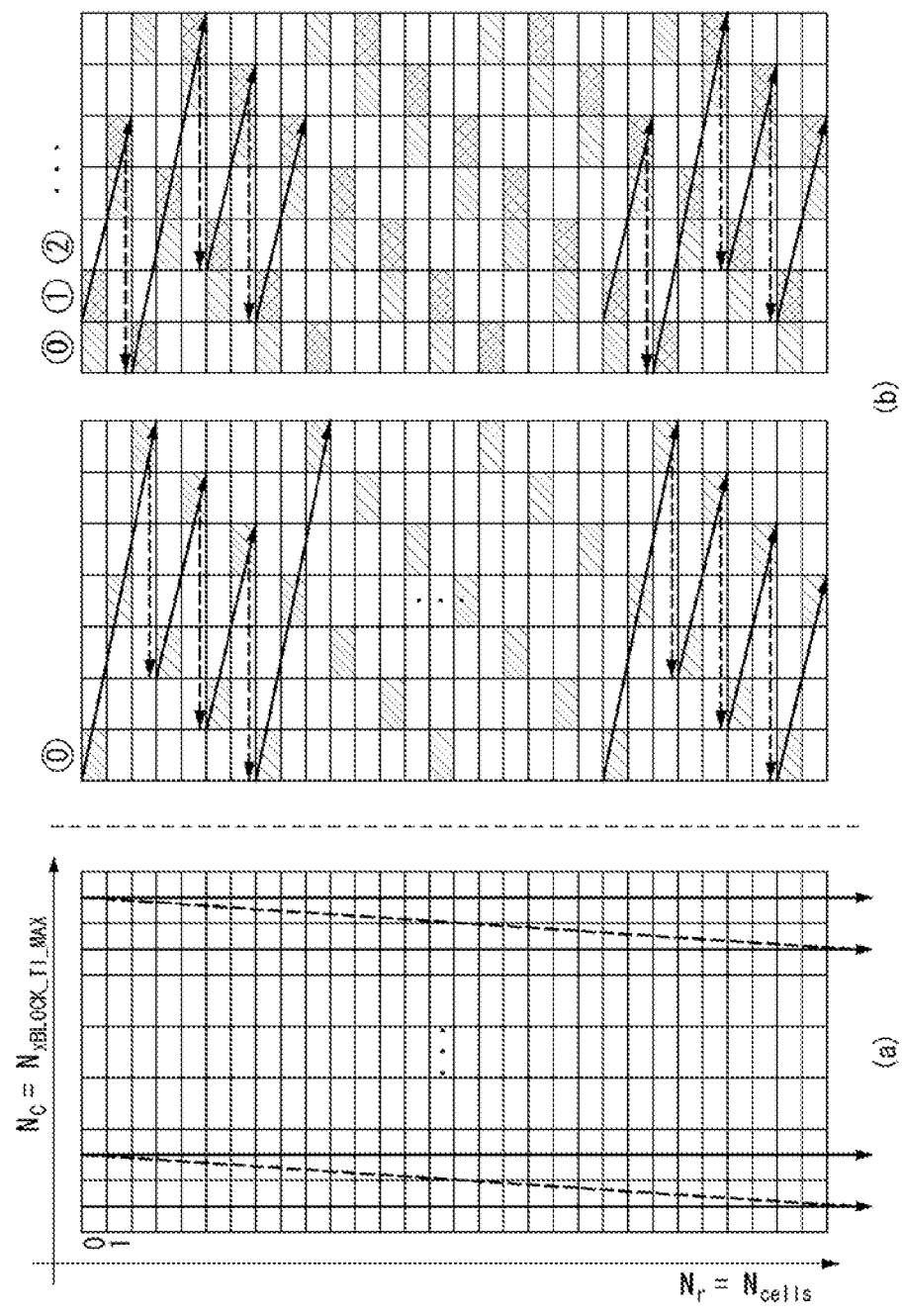
FIG. 26 illustrates a basic operation of a twisted row-column block interleaver according to an exemplary embodiment of the present invention.

FIG. 26 illustrates a basic operation of a twisted row-column block interleaver according to an exemplary embodiment of the present invention.

FIG. 26A illustrates a writing operation in a time interleaver and FIG. 26B illustrates a reading operation in the time interleaver. As illustrated in FIG. 26A, a first XFEC-BLOCK is written in a first column of a time interleaving memory in a column direction and a second XFECBLOCK is written in a next column, and such an operation is continued. In addition, in an interleaving array, a cell is read in a diagonal direction. As illustrated in FIG. 26B, while the diagonal reading is in progress from a first row (to a right side along the row starting from a leftmost column) to a last row, $N_r$ cells are read. In detail, when it is assumed that $z_{n,s,i}$ (i=0, . . . , $N_r N_c$) is a time interleaving memory cell position to be sequentially read, the reading operation in the interleaving array is executed by calculating a row index $N_{n,s,i}$, a column index $C_{n,s,i}$, and associated twist parameter $T_{n,s,i}$ as shown in an equation given below.

$$\text{GENERATE}(R_{n,s,i}, C_{n,s,i}) = \quad \text{[Equation 9]}$$
$$\{$$
$$R_{n,s,i} = \text{mod}(i, N_r),$$
$$T_{n,s,i} = \text{mod}(S_{shift} \times R_{n,s,i}, N_c),$$
$$C_{n,s,i} = \text{mod}\left(T_{n,s,i} + \left\lfloor \frac{i}{N_r} \right\rfloor, N_c\right)$$
$$\}$$

Where, $N_{shift}$ is a common shift value for a diagonal reading process regardless of $N_{xBLOCK\_TI}(n,s)$ and the shift value is decided by $N_{xBLOCK\_TI\_MAX}$ given in PLS2-STAT as shown in an equation given below.

$$\text{for} \begin{cases} N'_{xBLOCK\_TI\_MAX} = N_{xBLOCK\_TI\_MAX} + 1, & \text{if } N_{xBLOCK\_TI\_MAX} \text{mod} 2 = 0 \\ N'_{xBLOCK\_TI\_MAX} = N_{xBLOCK\_TI\_MAX}, & \text{if } N_{xBLOCK\_TI\_MAX} \text{mod} 2 = 1 \end{cases}, \quad \text{[Equation 10]}$$

$$S_{shift} = \frac{N'_{xBLOCK\_TI\_MAX} - 1}{2}$$

Consequently, the cell position to be read is calculated by a coordinate $z_{n,s,i} = N_r C_{n,s,i} + R_{n,s,i}$.

Figure 27:
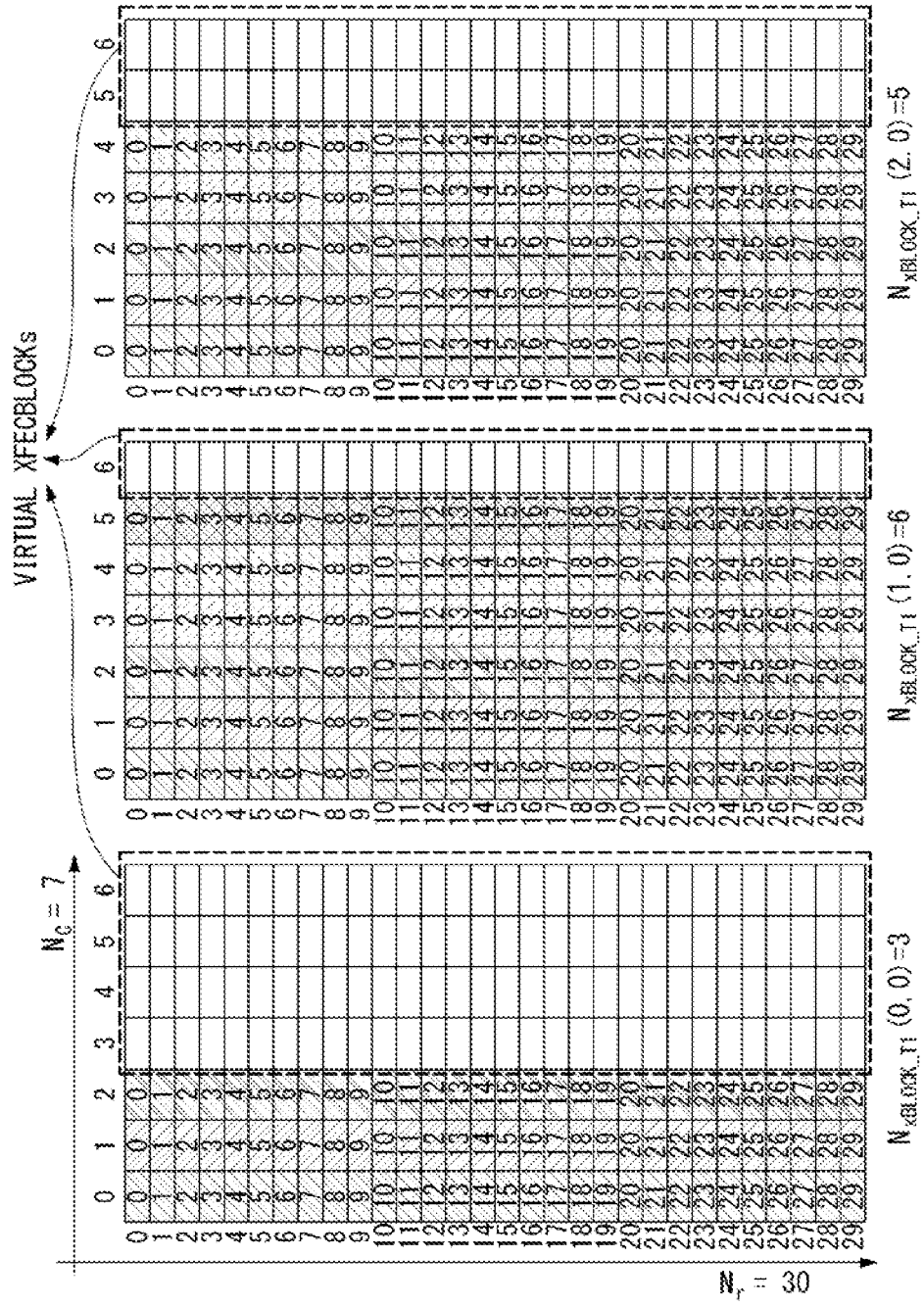
FIG. 27 illustrates an operation of a twisted row-column block interleaver according to another exemplary embodiment of the present invention.

FIG. 27 illustrates an operation of a twisted row-column block interleaver according to another exemplary embodiment of the present invention.

In more detail, FIG. 27 illustrates an interleaving array in the time interleaving memory for respective time interleaving groups including a virtual XFECBLOCK when $N_{xBLOCK\_TI}(0,0)=3$, $N_{xBLOCK\_TI}(1,0)=6$, and $N_{xBLOCK\_TI}(2,0)=5$.

A variable $N_{xBLOCK\_TI}(n,s)=N_r$ will be equal to or smaller than $N'_{xBLOCK\_TI\_MAX}$. Accordingly, in order for a receiver to achieve single memory interleaving regardless of $N_{xBLOCK\_TI}(n,s)$, the size of the interleaving array for the twisted row-column block interleaver is set to a size of $N_r \times N_c = N_{cells} \times N'_{xBLOCK\_TI\_MAX}$ by inserting the virtual XFECBLOCK into the time interleaving memory and a reading process is achieved as shown in an equation given below.

$$p = 0; \quad \text{[Equation 11]}$$

$$\text{for } i = 0; i < N_{cells} N'_{xBLOCK\_TI\_MAX}; i = i+1$$

$$\{\text{GENERATE}(R_{n,s,i}, C_{n,s,i});$$

$$V_i = N_r C_{n,s,j} + R_{n,s,j}$$

-continued if $V_i < N_{cells} N_{xBLOCK\_TI}(n, s)$

{

$Z_{n,s,p} = V_i; p = p + 1;$

}

}

The number of the time interleaving groups is set to 3. An option of the time interleaver is signaled in the PLS2-STAT by DP_TI_TYPE '0', DP_FRAME_INTERVAL='1', and DP_TI_LENGTH='1', that is, NTI=1, IJUMP=1, and PI=1. The number of respective XFECBLOCKs per time interleaving group, of which Ncells=30 is signaled in PLS2-DYN data by NxBLOCK_TI(0,0)=3, NxBLOCK_TI(1,0)=6, and NxBLOCK_TI(2,0)=5 of the respective XFECBLOCKs. The maximum number of XFECBLOCKs is signaled in the PLS2-STAT data by NxBLOCK_Group_MAX and this is continued to $\lfloor N_{xBLOCK\_Group\_MAX} / N_{TI} \rfloor = N_{xBLOCK\_TI\_MAX} = 6$.

Figure 28:
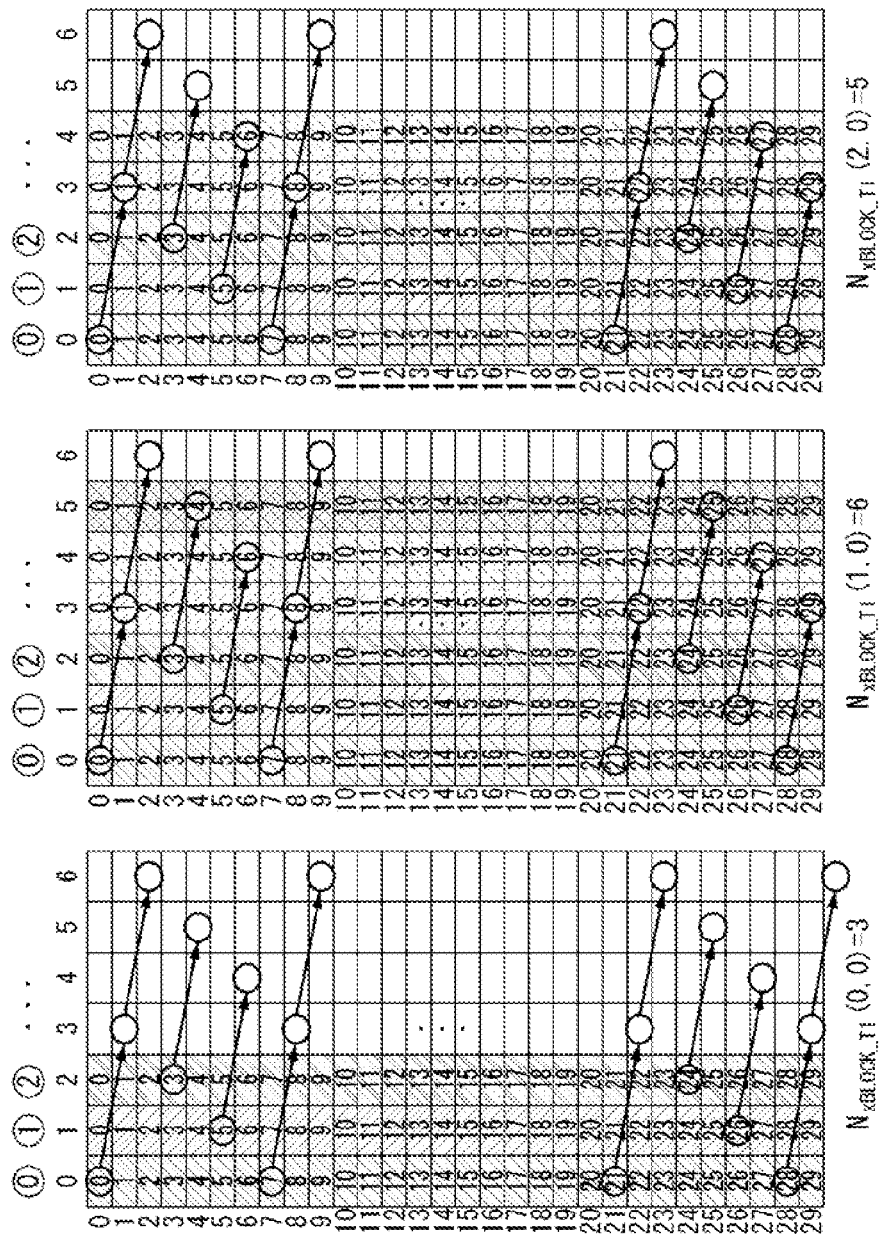
FIG. 28 illustrates a diagonal reading pattern of the twisted row-column block interleaver according the exemplary embodiment of the present invention.

FIG. 28 illustrates a diagonal reading pattern of the twisted row-column block interleaver according to the exemplary embodiment of the present invention.

In more detail, FIG. 28 illustrates a diagonal reading pattern from respective interleaving arrays having parameters $N'_{xBLOCK\_TI\_MAX}=7$ and Sshift=(7−1)/2=3. In this case, during a reading process expressed by a pseudo code given above, when $V_i \geq N_{cells} N_{xBLOCK\_TI}(n,s)$, value of Vi is omitted and a next calculation value of Vi is used.

FIG. 29 illustrates XFECBLOCK interleaved from each interleaving array according to an exemplary embodiment of the present invention.

FIG. 29 illustrates XFECBLOCK interleaved from each interleaving array having parameters $N'_{xBLOCK\_TI\_MAX}=7$ and Sshift=3 according to an exemplary embodiment of the present invention.

Figure 30:
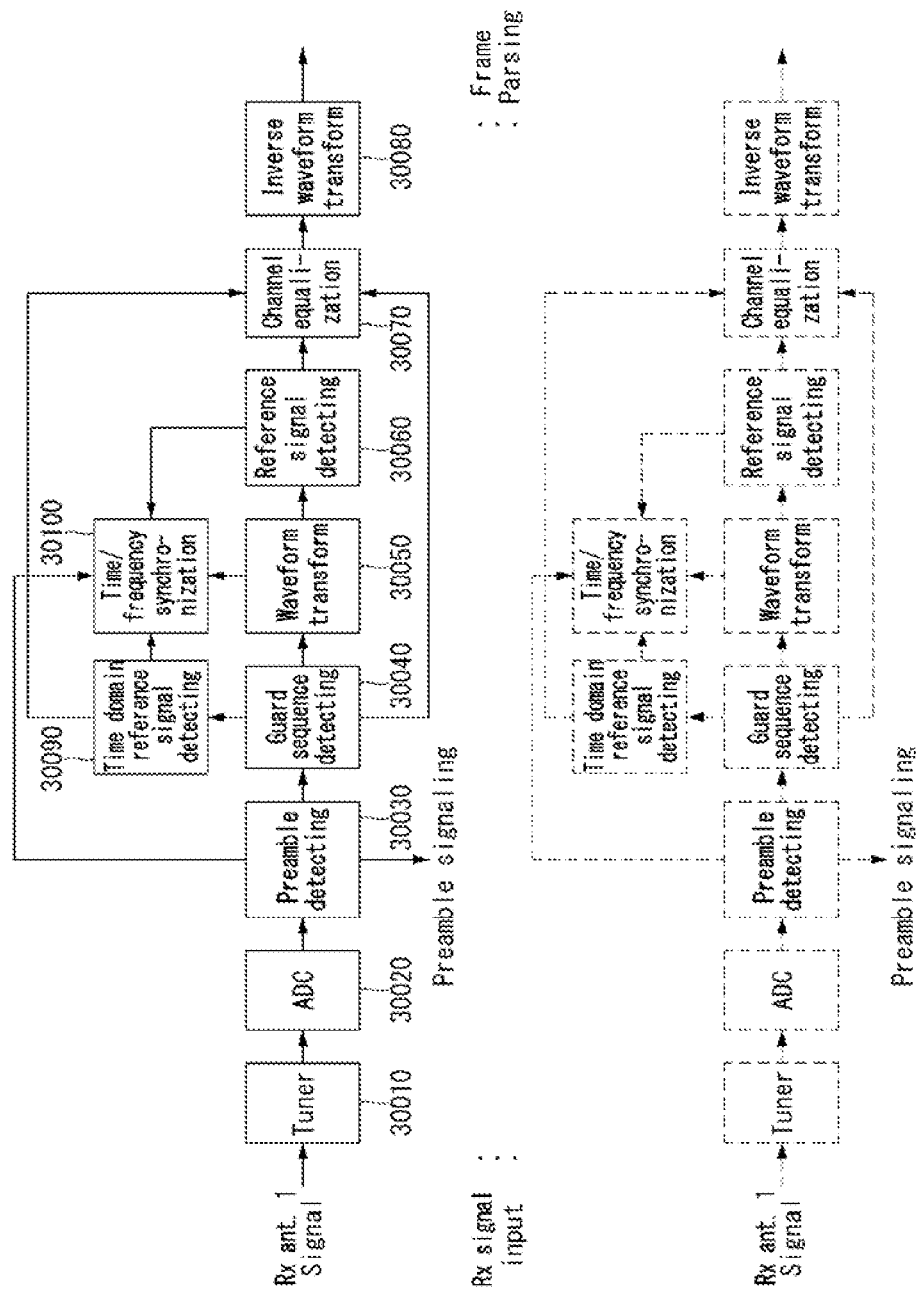
FIG. 30 illustrates a block diagram of a synchronization & demodulation module of a broadcast signal receiver in detail according to one embodiment of the present invention.

FIG. 30 illustrates a block diagram of a synchronization & demodulation module of a broadcast signal receiver in detail according to one embodiment of the present invention.

FIG. 30 illustrates a sub-modules included in the synchronization & demodulation module 9000 of FIG. 9.

The synchronization/demodulation module comprises a tuner 30010 for tuning to a broadcast signal, an ADC module 30020 for converting a received analog signal to a digital signal, a preamble detecting module 30030 for detecting a preamble included in a received signal, a guard sequence detecting module 30040 for detecting a guard sequence included in a received signal, a waveform transform module 30050 for performing FFT on a received signal, a reference signal detecting module 30060 for detecting a pilot signal included in a received signal; a channel equalizer 30070 for performing channel equalization by using an extracted guard sequence, an inverse waveform transform module 30100, a time domain reference signal detecting module 30090 for detecting a pilot signal in the time domain, and a time/frequency synchronization module 30100 for performing time/frequency synchronization of a received signal by using a preamble and a pilot signal. The inverse waveform transform module 30080 performs transformation with respect to the inverse FFT, which may be omitted according to a particular embodiment or replaced with a different module that performs the same or a similar function thereof.

FIG. 30 illustrates a case where the receiver processes a signal received by multiple antennas through multiple paths; identical modules are shown in parallel, descriptions of which are not provided.

In the present invention, the receiver can detect and utilize a pilot signal by using the reference signal detecting module 30060 and the time domain reference signal detecting module 30090. The reference signal detecting module 30060 can detect a pilot signal in the frequency domain, and the receiver can perform synchronization and channel estimation by using the characteristics of the detected pilot signal. The time domain reference signal detecting module 30090 can detect a pilot signal in the time domain of a received signal, and the receiver can perform synchronization and channel estimation by using the characteristics of the detected pilot signal. This document refers to at least one of the module 30060 detecting a pilot signal in the frequency domain and the module 30090 detecting a pilot signal in the time domain as a pilot signal detecting module. Also, in this document, a reference signal is referred to as a pilot signal.

The receiver can detect a CP pattern included in a received signal and perform synchronization through coarse Auto-Frequency Control (AFC), fine AFC, and Common Phase Error (CPE) correction by using the detected CP pattern. The receiver can detect pilot signals included in a received signal by using the pilot signal detecting module and perform time/frequency synchronization by comparing the detected pilot signals with those pilot signals known to the receiver.

The present invention attempts to design a CP pattern that achieves various goals and effects. First, the CP pattern according to the present invention attempts to reduce signaling information and simplify interaction in time interleaving and carrier mapping by maintaining the Number of Active data carrier (NoA) in each OFDM symbol with respect to the predetermined Number of active Carrier (NoC) and a predetermined SP pattern.

Also, the present invention attempts to change the NoC and the CP pattern according to the SP pattern to achieve the condition above. Also the CP pattern according to the present invention attempts to select SP-bearing CP and non-SP-bearing CP fairly so that roughly even distribution over spectrum and random position distribution over spectrum can be achieved to combat a frequency selective channel. And the CP pattern is composed so that the overall overhead of the CP can be preserved and the number of CP positions can be reduced according as the NoC is reduced. The SP-bearing CP and non-SP-bearing CP may be referred to as SP-bearing CP and non-SP-bearing CP. The SP-bearing CP represents the CP of which the position overlaps with the position of the SP, while the non-SP-bearing CP represents the CP of which the position does not overlap with the position of the SP.

The pattern or position information of a CP can be stored in the memory of a transmitter or a receiver in the form of an index table. However, since the SP pattern used in a broadcast system has been diversified and the mode of the NoC has been increased, the size of the index table has increased to occupy a large portion of the memory. Therefore, the present invention tries to solve the aforementioned problem and to provide a CP pattern that satisfies the goal and effects of the CP pattern described above.

In this document, the interval in the frequency domain among SPs included in an SP pattern is denoted by Dx, and the interval in the time domain is denoted by Dy. In other words, Dx represents separation among carriers bearing pilots along the frequency axis, while Dy represents the number of symbols forming one scattered pilot sequence along the time axis.

In the case of a broadcast system, spectrum masks may vary depending on countries and regions. Therefore, depending on the situation, bandwidth of a broadcast signal may have to be changed, and to this purpose, the present invention provides a flexible Number of Carriers (NoC) structure.

Figure 31:
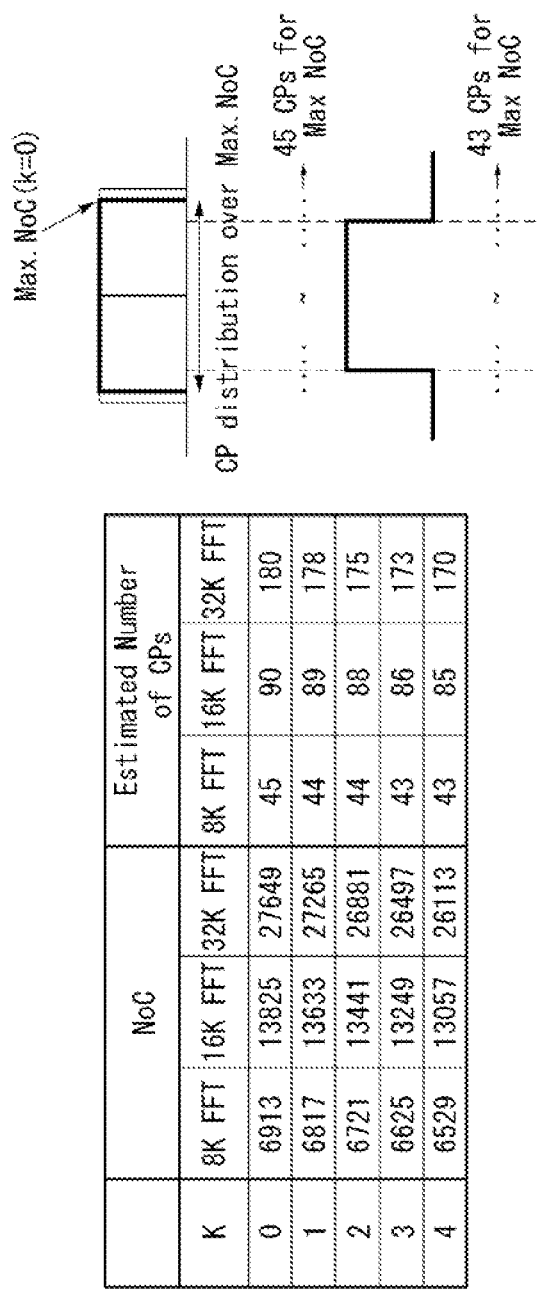
Figure 32:
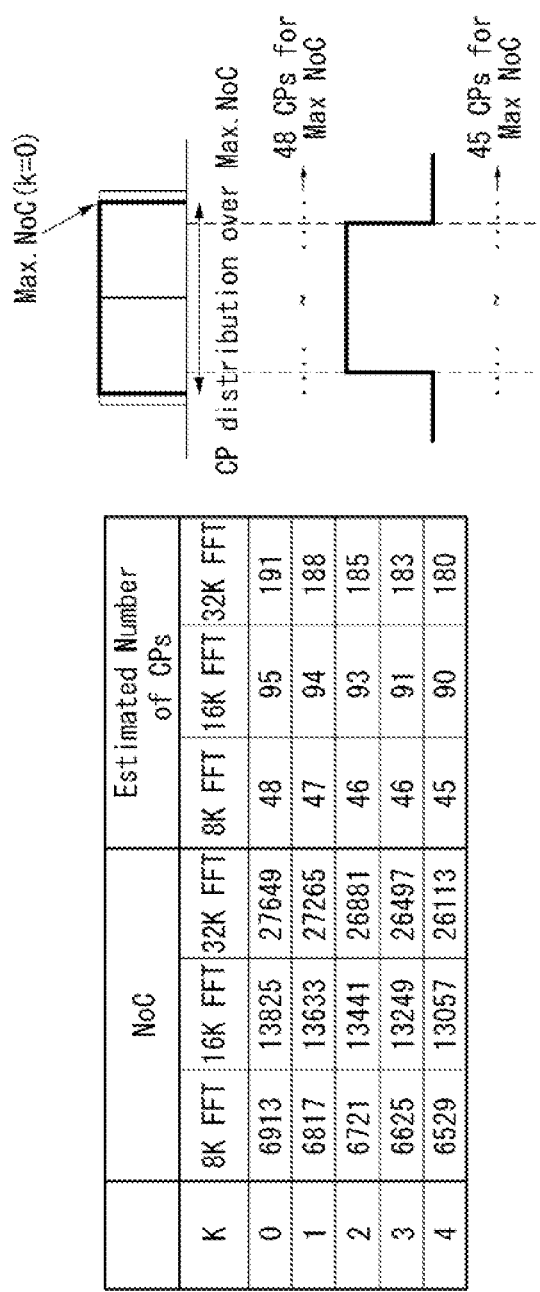

FIGS. 31 to 33 illustrate embodiments of a flexible NoC structure of a broadcast signal according to the present invention.

Two different methods can be used to compose a signal through the flexible NoC structure.

1) The minimum bandwidth and the minimum NoC according to the minimum bandwidth are determined, and by using the minimum bandwidth and the minimum NoC, NoC is extended by predetermined units. In this method, the non-SP-bearing CP designed according to the minimum NoC is not changed according as the NoC is extended, but since the extended bandwidth is not fully utilized, performance may be degraded. To this purpose, a table may have to be added to determine non-SP-bearing CP which is added as the NoC is increased.

2) The maximum bandwidth and the maximum NoC according to the maximum bandwidth are determined, and by using the maximum NoC, NoC is reduced by predetermined units. In this method, pilots which mask out the non-SP-bearing CP can be used by specifying a window corresponding to the maximum NoC. In this case, the number of CPs is designed to have a margin so that performance degradation due to NoC reduction can be prevented. In other words, the system is designed so that the minimum NoC reduced from the maximum NoC can have a particular number of non-SP-bearing CPs. Also, this method can be used to support such a case requiring additional narrow bandwidth or a smaller NoC. This method can be expressed by Eq. 12 below.

$$NoC = NoC\_Max - k*\Delta \quad \text{[Equation 12]}$$

In Eq. 12, NoC represents the number of carriers, namely, the number of symbols included in one signal frame, which is the number of OFDM subcarriers. $\Delta$ represents the control unit value, and k represents the coefficient multiplied to the control unit value to determine the number of carriers to be reduced. As shown in FIGS. 31 to 33, $\Delta$ can be changed according to the FFT size: $\Delta\_8K-FFT=96$, $\Delta\_16K-FFT=192$, and $\Delta\_32K-FFT=384$, respectively. k can take on one value from 0 to 4. k can also be expressed by reduction coefficient (C_(red_coeff)). The maximum NoC (NoC_Max) differs by the FFT size, and as shown in FIGS. 31 to 33, the maximum NoC can be 6529 for 8K FFT, 13057 for 16K FFT, and 26113 for 23 k FFT.

Depending on embodiments, the number of non-SP-bearing CPs can be determined by the maximum NoC or the minimum NoC. As shown in FIG. 31, the system can be structured so that the number of non-SP-bearing CPs with respect to the maximum NoC is 45, and the number of non-SP-bearing CPs with respect to the minimum NoC where k=4 is 43. However, in this case, performance in transmission and reception may be degraded if the bandwidth of the broadcast system is taken into consideration. Therefore, as shown in FIG. 32, the system can be designed so that while the bandwidth window is masked out as NoC is reduced from the maximum NoC, the number of non-SP-bearing CPs with respect to the minimum NoC becomes 45, and inversely, the number of non-SP-bearing CPs with respect to the maximum NoC becomes 48 to prevent performance degradation. FIG. 33 illustrates an embodiment of a method as shown in FIG. 32, where, in the case of 8K FFT, the number of non-SP-bearing CPs changes from 45 to 48; in the embodiment, NoC and the estimated number of CPs vary according to FFT sizes and the values of k.

The present invention composes a system such that NoC can be reduced in multiples of $\Delta$ according to the needs from the maximum NoC as shown in Eq. 12. Also, the system is further composed so that the number of non-SP-bearing CPs corresponds to 48 for 8K, 96 for 16K, and 192 for 96 according to the FFT size in the case of the maximum NoC; variation of the number of non-SP-bearing CPs according to the increase of k can be found from FIGS. 31 to 33.

In what follows, described will be a method for maintaining a constant NoA in case flexible NoC is used as described above.

In case flexible NoC is supported, NoC can be extended or reduced in units of Max (Dx); in this case, too, a constraint on the number of SP-bearing CPs and positions thereof is generated in order to maintain constant NoA. In case NoC is extended or reduced in units of Dx, such a constraint can be changed according to the SP pattern, FFT size, and k value.

FIGS. 34 to 37 illustrate cases according to one embodiment of the present invention, where constraints are generated to maintain a constant NoA when NoC is changed according to FFT size.

As described above, in case flexible NoC is supported, NoC is reduced by 96, 182, and 384 units according to k values and FFT sizes. However, the SP pattern is repeated by block units corresponding to Dx*Dy. Therefore, if the value of $\Delta$ being reduced does not correspond to the multiple of the Dx*Dy block, the pilot pattern configured for a constant NoA is violated. This is so because the NoC may not correspond to the multiple of Dx*Dy since the NoC is reduced by the maximum Dx unit. This fact can be expressed by the following equation.

$$MOD(NoC-1, Dx*Dy) \quad \text{[Equation 13]}$$

In Eq. 13, if the result value for k ranging from 0 to 4 is 0, NoA is maintained, but in other cases, the pilot pattern needs to be changed since the NoA is not maintained. This case occurs when the SP pattern is (Dx, Dy) {(32, 2), (16, 4), (32, 4)} in the case of 8K FFT and the SP pattern is (Dx, Dy)=(32, 4) in the case of 16K FFT.

FIG. 34 illustrates a case where the pilot pattern needs to be changed to support the constant NoA in case 8K FFT is used and the SP pattern (Dx, Dy)=(32, 2). In FIG. 34, in case 8K FFT is used and the SP pattern (Dx, Dy)=(32, 2), the value of MOD(NoC−1, Dx*Dy) is 0 for k=0, 2, 4; and 32 for k=1, 3. Therefore, in case k=1, 3, the pilot pattern needs to be changed to have a constant NoA.

Figure 35:
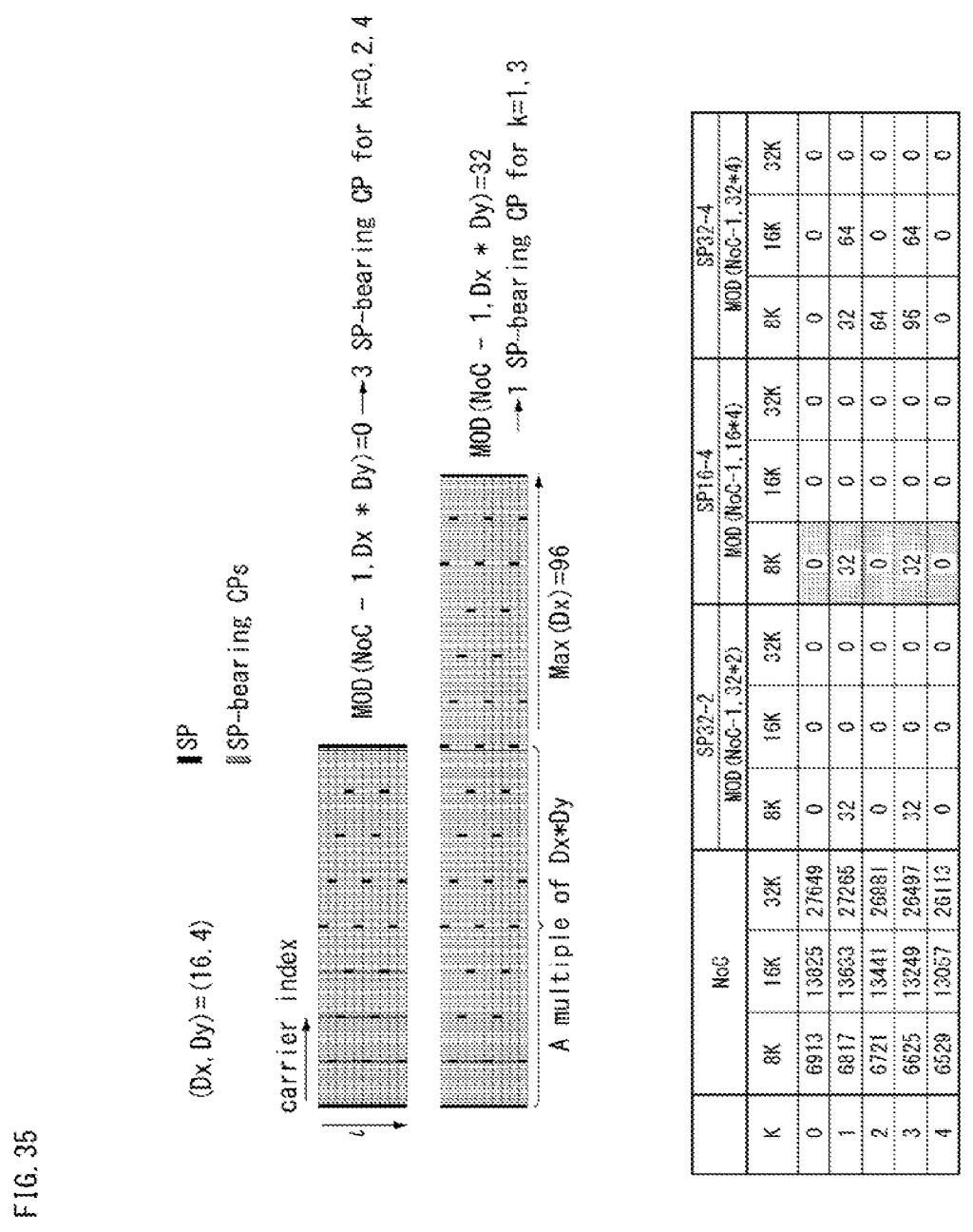

FIG. 35 illustrates a case where the pilot pattern needs to be changed to support the constant NoA in case 8K FFT is used and the SP pattern (Dx, Dy)=(16, 4). In FIG. 35, in case 8K FFT is used and the SP pattern (Dx, Dy)=(16, 4), the value of MOD(NoC−1, Dx*Dy) is 0 for k=0, 2, 3; and 32 for k=1, 3. Therefore, in case k=1, 3, the pilot pattern needs to be changed to have a constant NoA.

Figure 36:
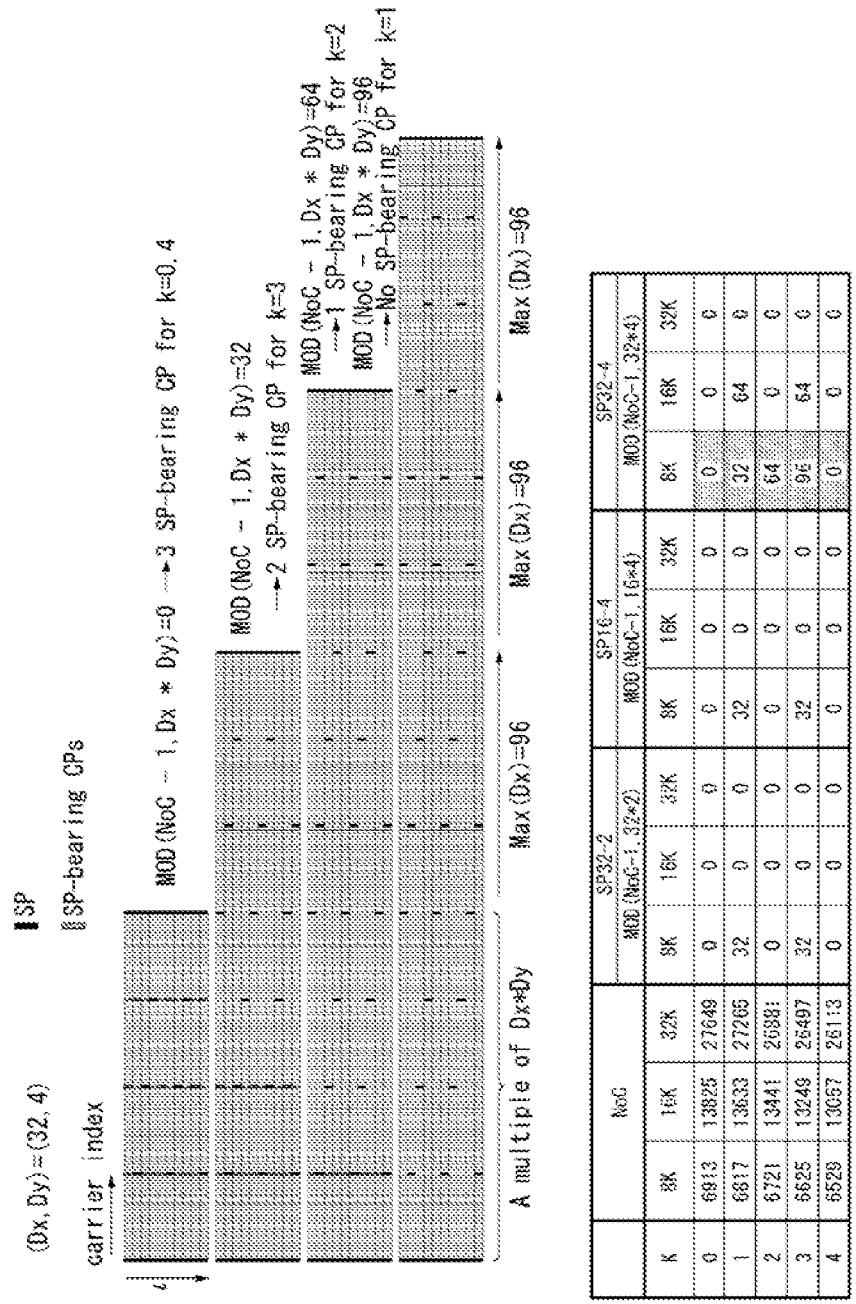

FIG. 36 illustrates a case where the pilot pattern needs to be changed to support the constant NoA in case 8K FFT is used and the SP pattern (Dx, Dy)=(32, 4). In FIG. 36, in case 8K FFT is used and the SP pattern (Dx, Dy) (32, 4), the value of MOD(NoC−1, Dx*Dy) is 0 for k=0, 4; 32 for k=1; 64 for k=2; and 96 for k=3. Therefore, in case k=1, 2, 3, the pilot pattern needs to be changed to have a constant NoA.

FIG. 37 illustrates a case where the pilot pattern needs to be changed to support the constant NoA in case 16K FFT is used and the SP pattern (Dx, Dy)=(32, 4). In FIG. 37, in case 16K FFT is used and the SP pattern (Dx, Dy)=(32, 4), the value of MOD(NoC−1, Dx*Dy) is 0 for k=0, 2, 4; and 63 for k=1, 3. Therefore, in case k=1, 3, the pilot pattern needs to be changed to have a constant NoA.

Change of the pilot pattern can be used to support a constant NoA according to the change of NoC by using a method for selectively using one SP-bearing CP in case Dy=2 and 1 to 3 SP-bearing CPs in case Cy=4, which will be described again below.

In what follows, described will be a method for generating a common CP set and an additional CP set as a method for generating a CP pattern according to an embodiment of the present invention. A common CP set refers to a set of non-SP-bearing CPs not overlapping with the SP, and an additional CP set refers to a set of SP-bearing CPs overlapping with the SP.

A broadcast system according to an embodiment of the present invention supports both 3 and 4 as a Dx basis value. Since the positions of the non-SP-bearing CP and the SP-bearing CP have to be indexed with predetermined values for all SP modes, the CP is designed with respect to the Dx basis value. Thus, design of the CP can be carried out by the following two methods for the Dx basis 3 and 4.

i) A CP set is designed independently for the Dx basis 3 and 4, and a CP index table is selected in association with selection of the SP mode. ii) One common CP set is selected by taking into account both of the Dx basis 3 and 4 of the selected SP mode, and only one CP index table is defined to be used independently of the SP mode selection.

Characteristics of the two methods above are as follows.

Since the method i) optimizes the position of a CP optimized for each Dx basis case, it provides a better performance than the method ii). Since the method ii) has the same CP index independently of the SP mode, there is no performance degradation due to discontinuity at the boundaries when sync tracking is required among the SP modes having different Dx bases. Also, the method ii) has the advantage that in case initial synchronization is required since the Dx basis is not known beforehand, the receiver can anyhow use an existing CP set compared with the case of using two CP sets. Therefore, in what follows, described will be a method for generating an SP pattern based on the method ii).

Figure 38:
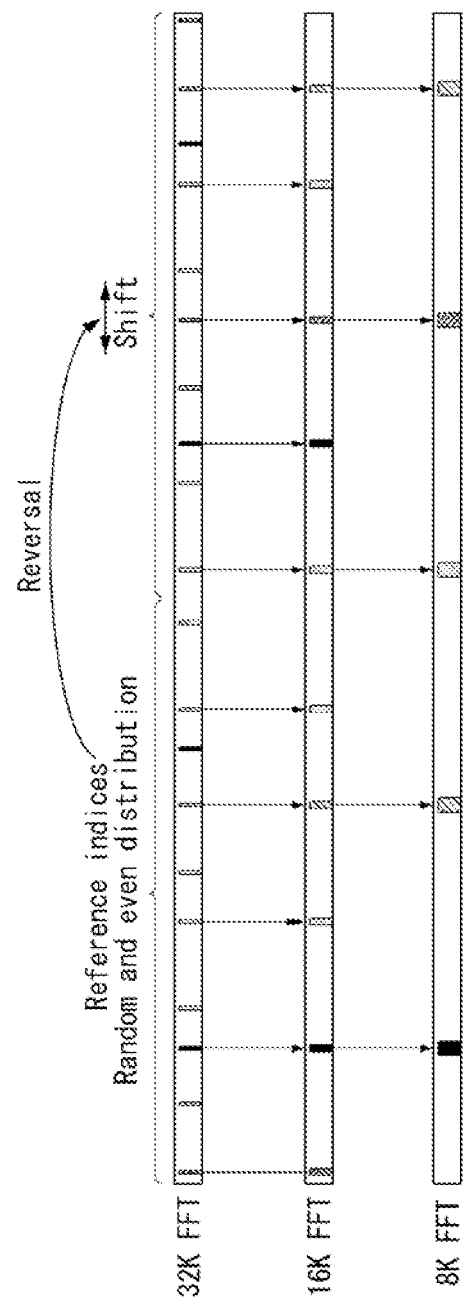
FIG. 38 illustrates a method for generating CP indices according to one embodiment of the present invention.

FIG. 38 illustrates a method for generating CP indices according to one embodiment of the present invention.

FIG. 38 illustrates a method for generating a common CP set, and according to the method, CP sets corresponding to various FFT sizes can be generated by using a reference CP set.

First of all, according to the present invention, a set of non-SP-bearing CPs not overlapping with an SP is generated by taking into account both of the aforementioned SP modes of Dx=3 and Dx=4, where the CP set can be called a reference CP set. The reference CP set can correspond to the left half of the 32K FFT mode CP set. In other words, since the number of CPs in the 32K FFT mode is 180 when k=0, the reference CP set can include 90 CPs. The reference CP set is generated to satisfy the condition that "CPs are positions to be distributed evenly and in random fashion over the predetermined spectrum". The reference CP set is extracted by taking into account various performances of a plurality of CP position patterns generated through a PN generator, which will be described later.

The CP set with respect to the 32K FFT mode (CP_32K) generates an additional right-half CP set (CP_32K,R) by reversing and shifting the reference CP set (CP_32K,L) and adding the right-half CP set to the reference CP set. The reversing operation may be called a mirroring operation, and the shifting operation may be called cycling shifting. The reversing and shifting operation may be regarded as the operation of reducing indices of the reference CP set at the reference carrier positions. The reference carrier position is determined with respect to the shifting value, which may be called a reference index or a reference index value. Generation of the right-half CP set of 32 K mode (CP_32K, R) and the method for generating a CP set of 32K FFT mode using the CP set may be expressed by the equation below.

$CP\_32K,R = \text{reference carrier index} - CP\_32K,L$ $$CP\_32K = [CP\_32K,L, CP\_32K,R] \quad \text{[Equation 14]}$$

A CP set for 16K FFT mode (CP_16) and a CP set for 8K FFT mode (CP_8) can be extracted respectively from the CP set for 32K FFT mode (CP_32). In this case, as shown in FIG. 38, the reference CP set is determined so that extracted CPs can be placed at the same position in the frequency domain.

According to the method, since the broadcast transmitter and the broadcast receiver only have to store the CP set corresponding to the half of the CP indices used in the 32K mode, size of the required memory can be reduced.

Figure 39:
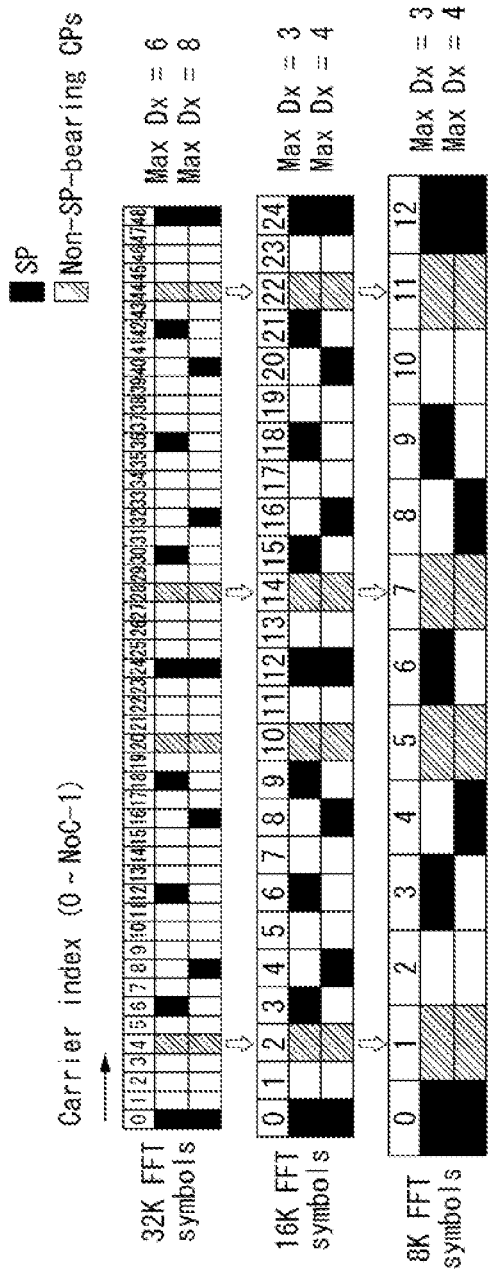
FIG. 39 illustrates a method for generating a CP set according to FFT size according to an embodiment of the present invention.

FIG. 39 illustrates a method for generating a CP set according to FFT size according to an embodiment of the present invention.

A plurality of conditions should be met to determine a reference CP set. For example, i) the position of an SP pattern having the largest Dx value that can be supported for each FFT mode should be avoided, ii) generation of a 16K and 8K CP set should be derived from the CP set of 32K FFT mode through a simple operation such as rounding, ceiling, or flooring, iii) continuity in absolute frequency for all FFT modes should be satisfied.

These CP indices are chosen in such a way to avoid the position of the SP as in FIG. 39, and in particular, the CP indices are also chosen to be positioned at the same position in the frequency domain for 16K and 8K modes. Among the indices chosen, those distributed as evenly and randomly as possible across the signal bandwidth are chosen to be included in the reference CP set.

As described above, if the CP set of 32K FFT mode (CP_32K) is generated by using the reference CP set, the CP set of 16K mode (CP_16K) and the CP set of 8K mode (CP_8K) can be obtained by using the CP set of 32 k FFT mode (CP_32K) and the equations below. In particular, if the condition for continuity in absolute frequency for all FFT modes is relieved, the number 18 can be applied. To achieve better precision of frequency position, more accurate channel estimation based on the more precise frequency position, and frequency/time synchronization, the present invention uses the ceiling operation of Eq. 15; however, operation of Eqs. 16 to 19 may be used depending on the needs.

$CP\_16K = \text{ceil}((\text{take every 2nd index of } CP\_32K)/2)$ $$CP\_18K = \text{ceil}((\text{take every 4th index of } CP\_32K)/4) \quad \text{[Equation 15]}$$

Equation 15 represents generating a CP set of 16 K mode by applying the ceiling operation on every second index of the CP set of 32K mode divided by two and generating a CP set of 8K mode by applying the ceiling operation on every fourth index of the CP set of 32K mode divided by 4. The ceiling operation value represents the smallest integer among those numbers larger than or equal to the target value.

$CP\_16K = \text{floor}((\text{take every 2nd index of } CP\_32K)/2) + 1$ $$CP\_18K = \text{floor}((\text{take every 4th index of } CP\_32K)/4) + 1 \quad \text{[Equation 16]}$$

Equation 16 represents generating a CP set of 16 K mode by applying the flooring operation on every second index of the CP set of 32K mode divided by two and generating a CP set of 8K mode by applying the flooring operation on every fourth index of the CP set of 32K mode divided by 4. The flooring operation value represents the largest integer among those numbers smaller than or equal to the target value.

CP_16$K$=round((take every 2nd index of CP_32$K$)/2)

CP_18$K$=round((take every 4th index of CP_32$K$)/4+1) [Equation 17]

CP_16$K$=round((take every 2nd index of CP_32$K$)/2)

CP_18$K$=round((take every 4th index of CP_32$K$)/4)+1 [Equation 18]

CP_16$K$=round((take every 2nd index of CP_32$K$)/2)

CP_18$K$=round((take every 4th index of CP_32$K$)/4) [Equation 19]

In Eqs. 17 to 19, the round operation returns an integer closest to the target value.

The condition for continuity in absolute frequency for all FFT modes should be satisfied in order to perform channel estimation more accurately even if the FFT size is changed. Since pilots are positioned at the same position even if the FFT size is changed, the broadcast receiver can estimate the channel more accurately and compensate the time/frequency offset by using the pilot positions of a preceding and following signal. In other words, it can be more effective particularly in such a case where FFT sizes are different from each other for each segment of a signal in one frame.

Figure 41:
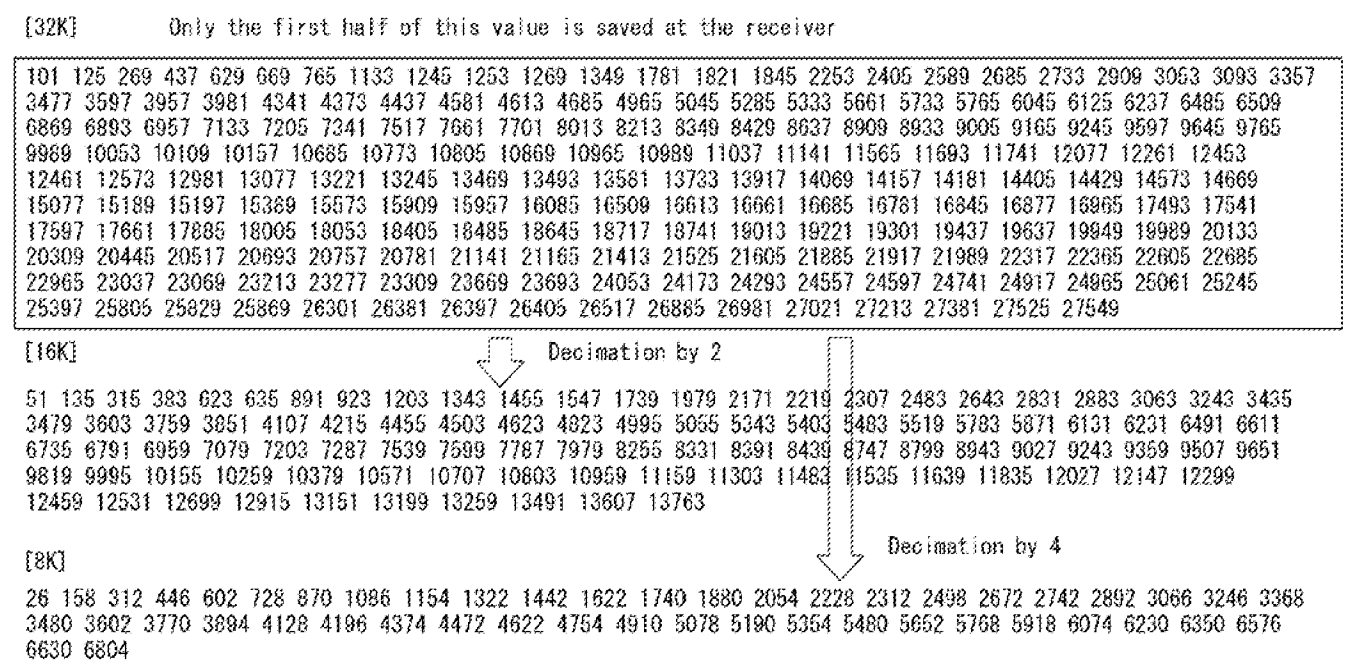

FIGS. 40 and 41 illustrate a method for generating a reference CP set and generating a CP pattern using the reference CP set according to one embodiment of the present invention.

FIG. 40 illustrates common CP sets, each of which is a set of CPs not including an SP.

FIG. 40 illustrates a reference CP set generated by taking into account the aforementioned conditions (CP_ref); and a method for generating a CP set when the FFT size is 32 K (CP_32K), a CP set when the FFT size is 16K (CP_16K), and a CP set when the FFT size is 8K (CP_8K).

In FIG. 40, CP_ref represents the reference CP set (CP_32K, L), including pilot indices corresponding to the first half of the 32K mode CP set (CP_32K). The 32K_mode CP set (CP_32K) is generated by using Eq. 14, of which the reference carrier index is 27649. The 16K mode CP set (CP_16K) and the 8K mode CP set (CP_8K) are generated individually by using Eq. 15.

FIG. 41 illustrates CP indices of 32K mode CP set, 16K mode CP set, and 8K mode CP set generated by using the reference CP set of FIG. 40.

FIGS. 42 to 45 illustrate a method for generating a reference CP set and generating a CP pattern using the reference CP set according to another one embodiment of the present invention.

FIG. 42 illustrates common CP sets, each of which is a set of CPs not including an SP.

FIG. 42 illustrates a different reference CP set generated by taking into account the aforementioned conditions (CP_32K, L or CP_ref); and a method for generating a CP set when the FFT size is 32 K (CP_32K), a CP set when the FFT size is 16K (CP_16K), and a CP set when the FFT size is 8K (CP_8K).

In FIG. 42, the reference CP set (CP_32K, L) includes pilot indices corresponding to the first half of the 32K mode CP set (CP_32K). The 32K mode CP set (CP_32K) is generated by using Eq. 14 (CP_32K, R=reference index value−CP_32K, L; and CP_32K=[CP_32K, L, CP_32K, R]), and the reference carrier index is 27648. The 16K mode CP set (CP_16K) and the 8K mode CP set (CP_8K) are generated by using Eq. 15 (CP_16 K=ceil ((take every 2nd index of CP32K)/2) and CP_16K=ceil (take every 2nd index of CP32K)/4), respectively. In other words, the 16K FFT CP set (CP_16K) can comprise the index values obtained by dividing the first, third, fifth index, and so on of the 32K FFT CP set (CP_32K) by 2 and applying the ceiling function to the division result, while the 8K FFT CP set (CP_8K) can comprise the index values obtained by dividing the first, fifth, ninth index, and so on of the 32K FFT CP set (CP_32K) by 4 and applying the ceiling function to the division result.

FIGS. 43 to 45 illustrate CP sets generated by using the reference CP set of FIG. 43, where FIG. 43 illustrates CP indices of 32K CP set, FIG. 44 illustrates CP indices of 16K CP set, and FIG. 45 illustrates CP indices of 8K CP set.

FIGS. 46 to 51 illustrate performance and distribution of CP sets shown in FIGS. 42 to 45.

Figure 46:
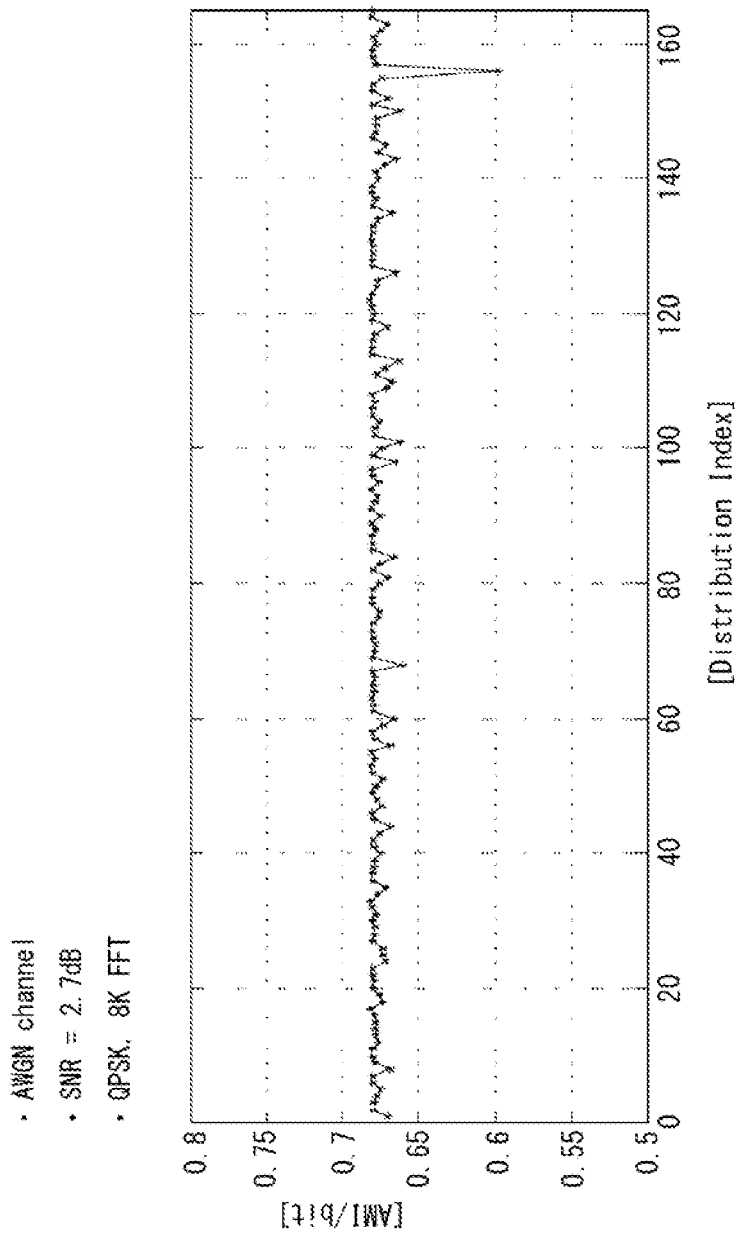
Figure 47:
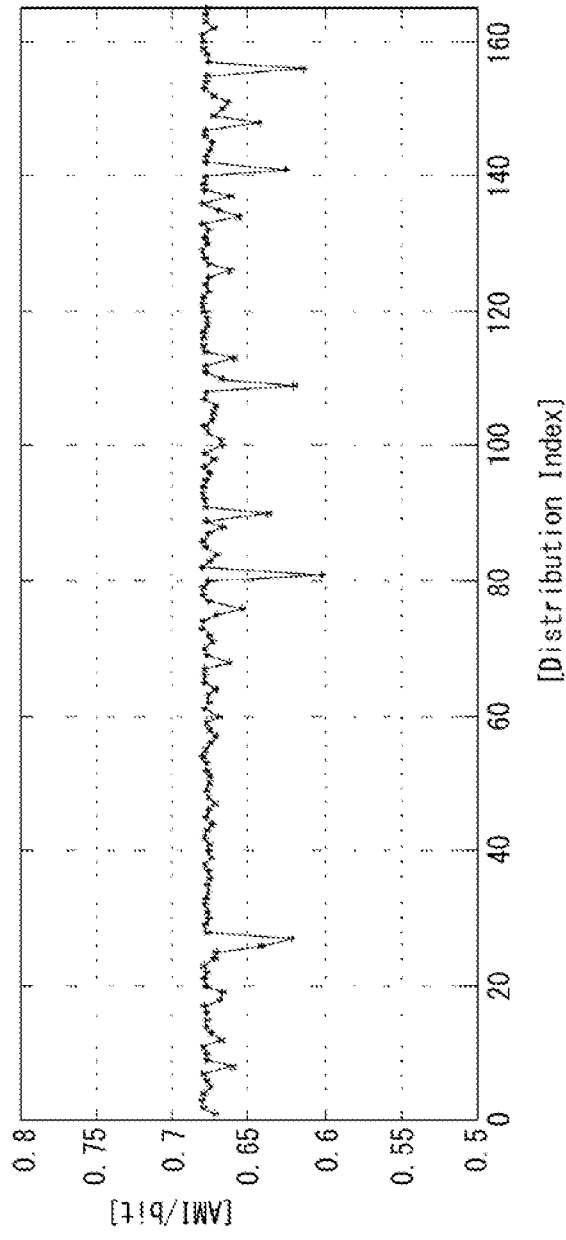
Figure 48:
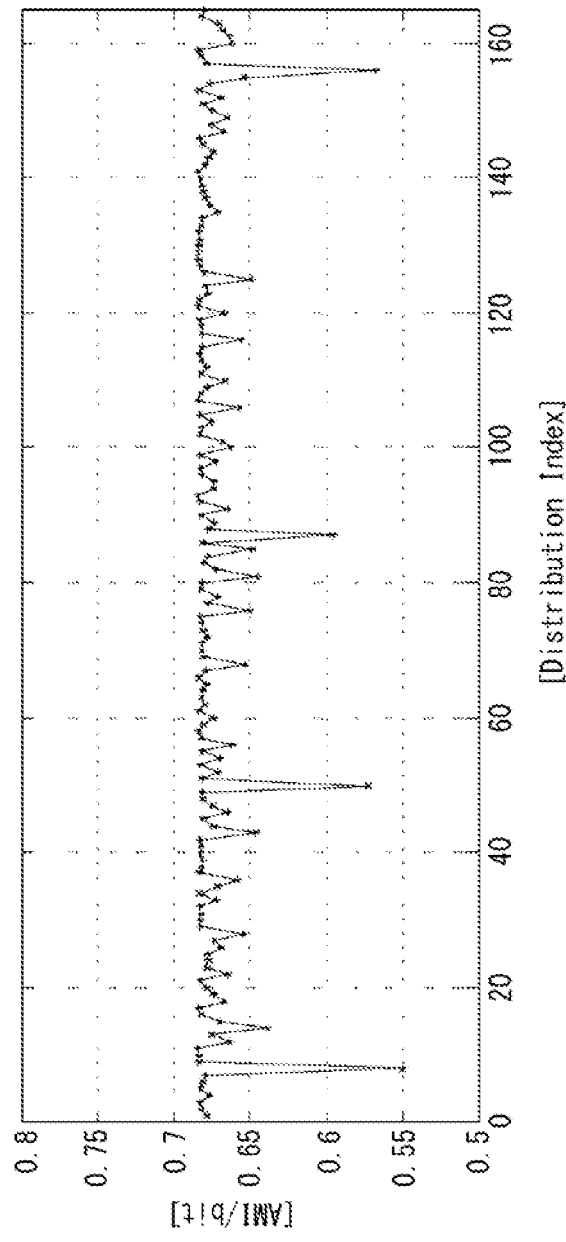
Figure 49:
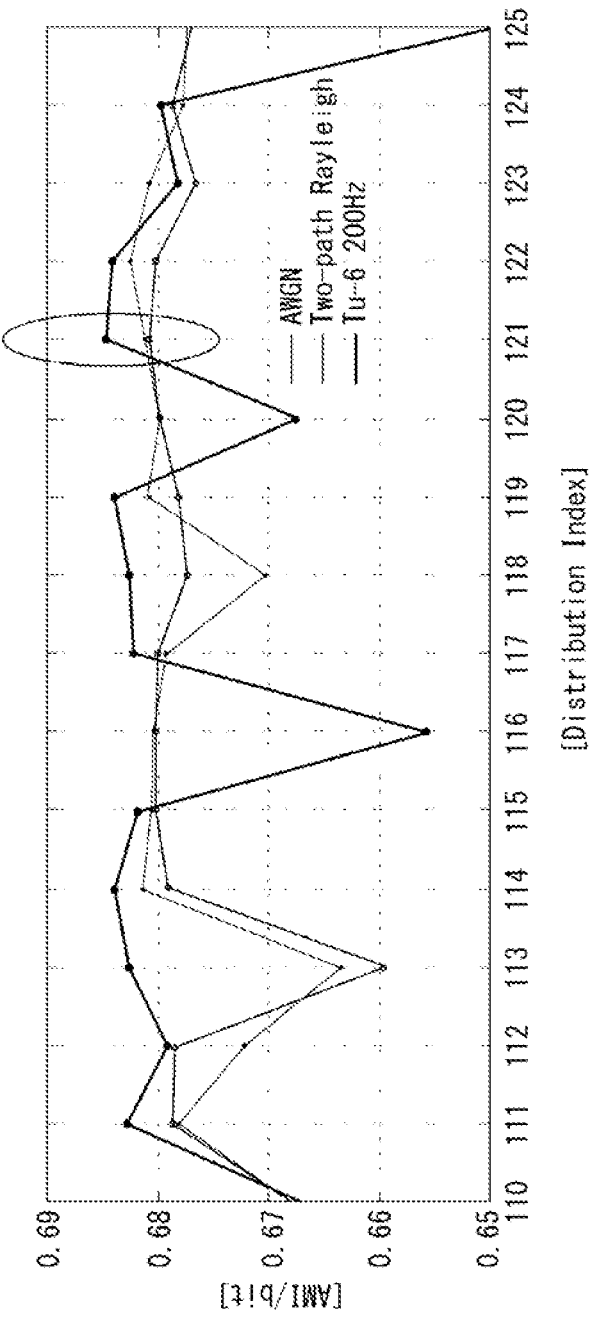

FIG. 46 illustrates an Average Mutual Information (AMI) plot showing a performance test result with respect to the AWGN channel, FIG. 47 illustrates an AMI plot showing a performance test result with respect to the 2-way Rayleigh channel, and FIG. 48 illustrates an AMI plot showing a performance test result with respect to Tu-6 200 Hz channel. And FIG. 49 illustrates a relationship between the Average Mutual Information (AMI)/bit and distribution index for each channel. The embodiments of FIGS. 42 to 45 correspond to the CP indices generated by taking into account the performance in various channels as shown in FIGS. 46 to 51, compared with the embodiments of FIGS. 40 and 41.

Figure 50:
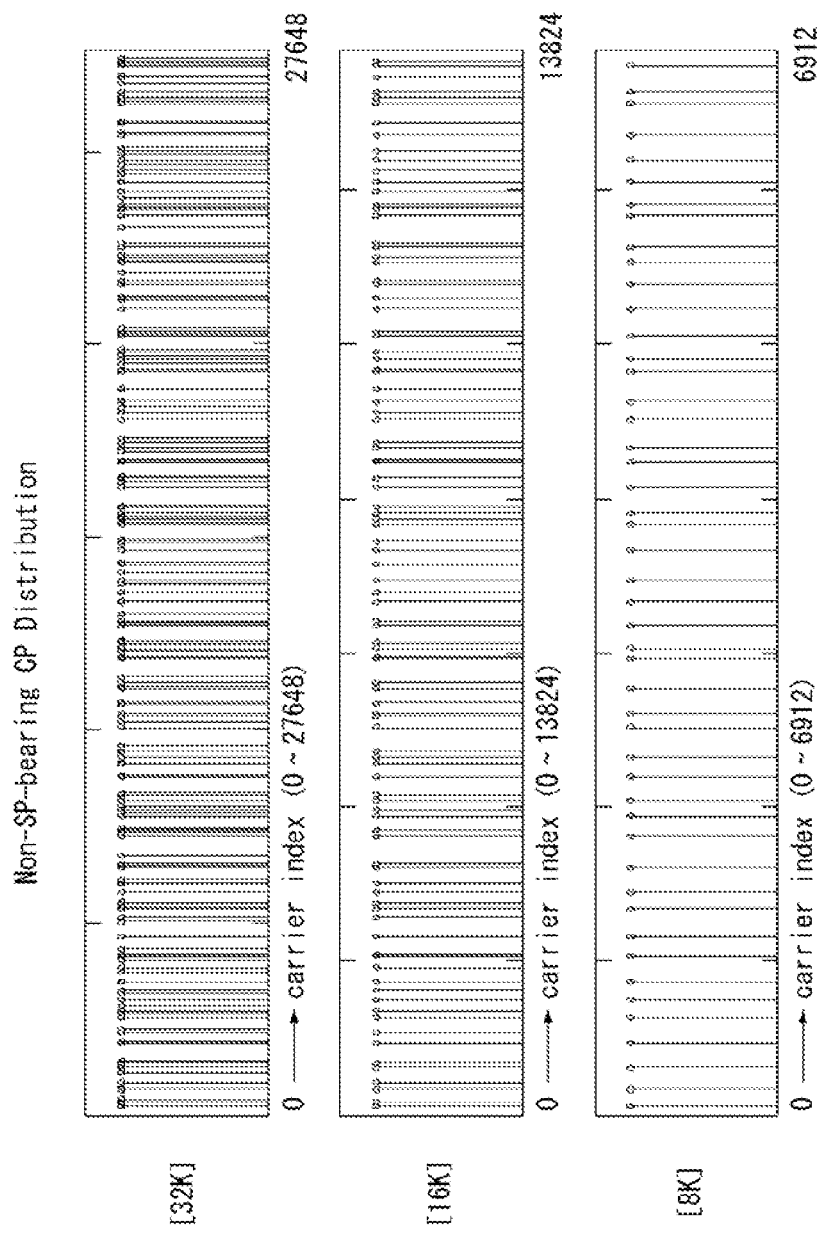

FIG. 50 illustrates that indices of the 32K mode CP set (CP_32K), 16K mode CP set (CP_16K), and 8K mode CP set (CP_8K) exhibit random and even distribution performance.

FIG. 51 is a magnified view of a part of the CP sets of FIG. 50. In FIG. 51, the 8K mode CPs are positioned at the same positions with the 16K mode and 32K mode CPs; and illustrates that the 16K mode CPs are also positioned at the same positions with the 32K mode CPs. Therefore, it can be understood from the descriptions above that performance of channel estimation and frequency synchronization can be improved.

FIG. 52 illustrates additional CP sets according to an embodiment of the present invention.

As described above, a CP set includes a common CP set and an additional CP set; and the additional CP set required to retain a constant NoA according to an SP pattern and FFT size (mode) is inserted additionally. The additional CP set is an SP-bearing CP, where fewer than 3 CPs can be inserted if Dy is 4, and one or zero CP can be inserted if Dy is 2.

Since the number of carriers is reduced by a multiple of the control unit value according as the flexible NoC is used as described with respect to FIGS. 34 to 37, the additional CP set has to be changed according to the NoC to retain constant NoA. In FIG. 52, the additional CP set changed in this sense is denoted by parentheses.

In the example of FIG. 52, the additional CP set is changed when the FFT mode is 16K and 8K and the SP mode is SP32-4; when the FFT mode is 8K and the SP mode is SP32-2; and when the FFT mode is 8K and the SP mode is SP16-4. The pilot indices in parentheses may not be used if k cannot be divided by 2, namely, in case k is an odd number (k mod 2=1 where k=1 or 3) in Eq. 12. Each case will be described later.

First, in case the SP pattern is SP32-2 and the FFT mode is 8K, the additional CP set can be changed. In other words, if k is an odd number (for example, k=1 or 3) in the case of flexible NoC, the SP-bearing CP of the CP index 1696 may not be used and the additional SP-bearing CP may not be defined at all.

In case the SP pattern is SP16-4 and the FFT mode is 8K, the additional CP set can be changed. In other words, if k is an odd number (for example, k=1 or 3) in the case of flexible NoC, the CP of index 2912 and the CP of index 5744 may not be used, but only the SP-bearing CP of index 1744 can be added.

In case the SP pattern is SP32-4 and the FFT mode is 16K, the additional CP set can be changed. In other words, if k is an odd number (for example, k=1 or 3) in the case of flexible NoC, the CP of index 5824 and the CP of index 11488 may not be used, but only the SP-bearing CP of index 3488 can be added.

In case the SP pattern is SP32-4 and the FFT mode is 8K, the additional CP set can be changed, and in this case the additional CP set can be inserted differently according to the k value. In other words, if k=1 in the case of flexible NoC, all of the CP of index 1696, CP of index 2880, and CP of index 5728 may not be used nor may the additional CP set be inserted additionally. In case k=2, the CP of index 2880 and the CP of index 5728 may not be used, but only the SP-bearing CP of index 1697 can be added. In case k=3, the CP of index 5728 may not be used, but the SP-bearing CP of index 1697 and the SP-bearing CP of index 2880 can be added. And in case k=0 or k=4, the SP-bearing CPs of index 1696, index 2880, and index 5728 can be added.

In this way, a CP set can be constructed so that a constant NoA can be retained even if bandwidth is masked out as the NoC is formed in a flexible manner.

Figure 53:
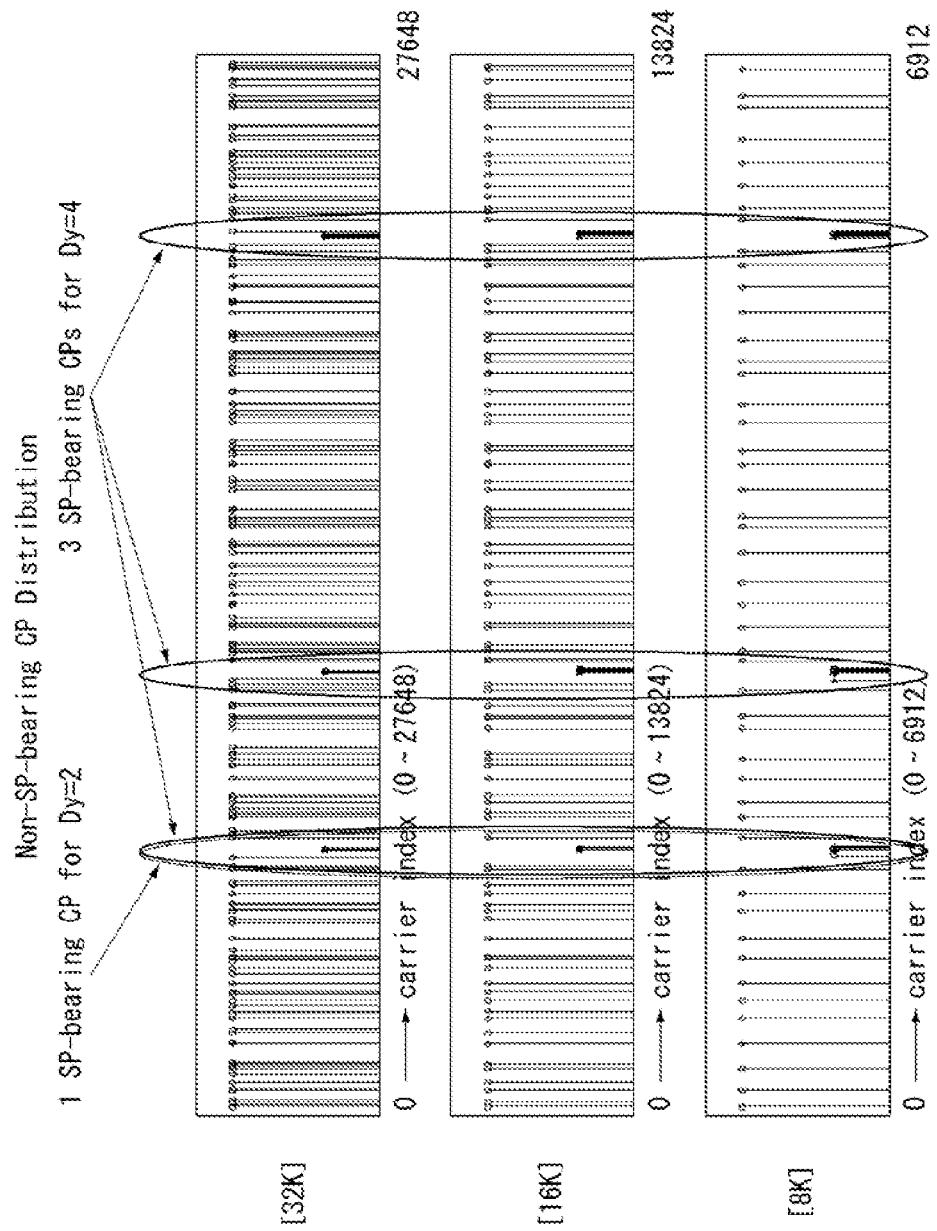
FIG. 53 illustrates a method for positioning the index of an additional CP set of FIG. 52.

FIG. 53 illustrates a method for positioning the index of an additional CP set of FIG. 52.

As described above, in case Dy=2 and Dy=4, 1 and 3 SP-bearing CPs can be added respectively. The SP-bearing CPs are defined at such positions to satisfy the constant NoA, and among those positions, the SP-bearing CPs are inserted to where the CPs can be distributed more evenly and randomly as in FIG. 53.

Figure 54:
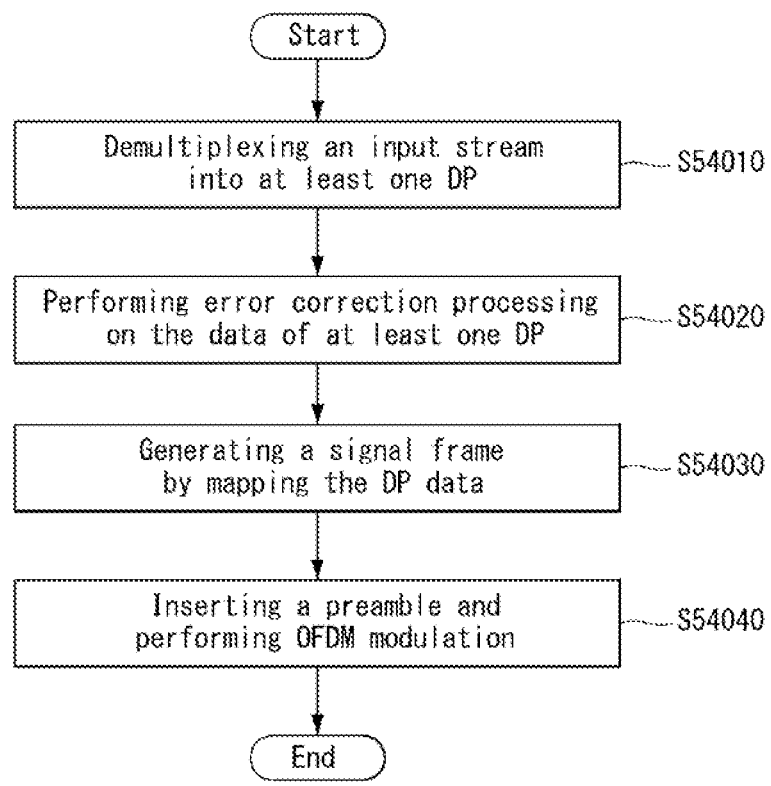
FIG. 54 illustrates a method for transmitting a broadcast signal of another broadcast signal transmitter according to an embodiment of the present invention.

FIG. 54 illustrates a method for transmitting a broadcast signal of another broadcast signal transmitter according to an embodiment of the present invention.

As described above with respect to the broadcast signal transmitter and its operation, the broadcast signal transmitter can demultiplex input streams into at least one Data Pipe (DP), namely, Physical Layer Pipe (PLP) by using the input formatting module S54010. And the broadcast signal transmitter can perform error correction processing or FEC encoding on the data included in at least one DP (PLP) by using the BICM module S54020. The broadcast signal transmitter can generate a signal frame by mapping the data within the PLP by using the frame building module S54030. The broadcast signal transmitter can insert a preamble into a transmission signal and perform OFDM modulation by using the OFDM generation module S54040. Insertion of a pilot by the broadcast signal transmitter can be carried out by using the methods of FIG. 8 and FIGS. 30 to 53.

The OFDM generation module further comprises a pilot signal insertion module and the performing OFDM modulation S54040 can further comprise inserting a pilot signal including CP and SP into the transmission signal. The CP is inserted into every symbol of the signal frame, and the position of and the number for the CP may be determined based on the FFT size/mode. However, the CP may not be inserted into the preamble symbol part or the bootstrap symbol part.

The broadcast signal transmitter can generate a signal frame by using the frame building module, and in this case, configure the NoC to be flexible, and generate a signal frame according to the configured NoC. In other words, the number of carriers included in the signal frame can be reduced by the unit of multiplication of the control unit value and a predetermined coefficient from the number of the maximum carriers, where the control unit value can correspond to the predetermined number of carriers based on the FFT size. At this time, the control unit value can correspond to 96 in case the FFT size is 8, 192 in case the FFT size is 16, and 384 in case the FFT size is 32. The number of NoC may be transmitted or received being included in the preamble as signaling information. For example, the information representing the coefficient of NoC reduction, k, may be transmitted or received being included in the preamble.

CPs can include a common CP set and an additional CP set. The CPs belonging to a common CP set can be disposed at the positions not overlapping with the SP, while the CPs of an additional CP set can be disposed at the positions overlapping with the SP.

The common CP set can be determined as in FIGS. 31 to 33 and FIGS. 38 to 45. In other words, the reference CP set corresponding to the first half of the 32K FFT mode CP set is stored in the broadcast signal transmitter, and by using the reference CP set, the broadcast signal transmitter can generate and insert 32K, 16K, and 8K mode CP sets respectively as described. In other words, the 32K mode CP set can be generated by adding a right-end CP set generated by reversing and shifting the reference CP into the reference CP set. The 16K mode CP set can be generated by extracting CPs of every second index from among the CPs belonging to the 32K mode CP set, while the 8K mode CP set can be generated by extracting CPs of every fourth index from among the CPs belonging to the 32K mode CP set.

The additional CP set can be inserted into a broadcast signal as shown in FIG. 52. In other words, in case NoC is reduced, a specific FFT size and an additional CP set with respect to a specific SP pattern can be added as different CP indices according to predetermined coefficients.

Figure 55:
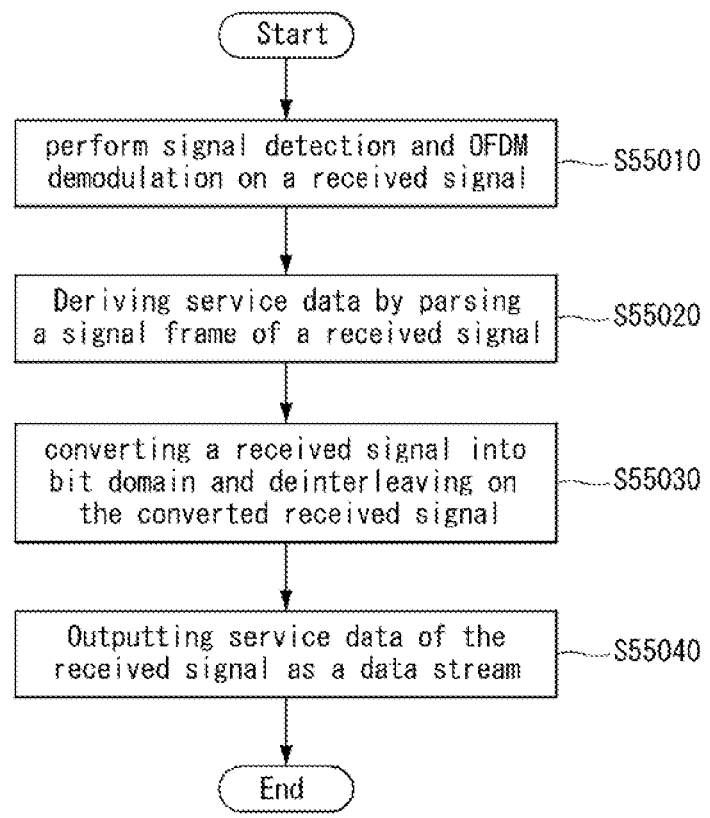
FIG. 55 illustrates a method for receiving a broadcast signal according to one embodiment of the present invention.

FIG. 55 illustrates a method for receiving a broadcast signal according to one

As described above with respect to the broadcast signal receiver and its operation, the broadcast signal receiver can perform signal detection and OFDM demodulation on a received broadcast signal by using the synchronization/demodulation module S55010. The broadcast receiver can extract service data by parsing a signal frame of a received broadcast signal by using the frame parsing module S55020. The broadcast signal receiver can convert service data extracted from the received broadcast signal into the bit domain and perform deinterleaving on the converted service data by using the demapping and decoding module S55030. And the broadcast signal receiver can output service data processed by the output processing module into a data stream S55040.

The synchronization/demodulation module further comprises a pilot signal detecting module, and the performing OFDM demodulation S55010 can further comprise detecting a pilot signal such as the CP and SP from a transmission signal. The CP is inserted into every symbol of the signal frame, and the position of and the number for the CP may be determined based on the FFT size/mode.

The frame parsing module of the broadcast signal receiver can parse the signal frame according to the NoC, and information of the NoC intended for the parsing may be transmitted or received being included in the preamble as signaling information. For example, the information representing the coefficient of NoC reduction, k, may be transmitted or received being included in the preamble.

The synchronization/demodulation module of the broadcast signal receiver can further comprise the time/frequency synchronization module and can perform time/frequency synchronization by using pilot signals detected by the pilot detecting module. Since the pilot signals of the aforementioned received signal have the structure/characteristics of the pilot signal inserted by the broadcast signal transmitter described above, the characteristics about the pilot signals of the transmitter can be applied the same to the received broadcast signal. In other words, descriptions of the signal structure, pilot structure, and so on related to FIG. 54 can all be applied to the broadcast signal received by the broadcast receiver of FIG. 55.

The broadcast signal receiver can perform time/frequency synchronization by comparing the pilot signal detected by the time/frequency synchronization module with the predetermined pilot signal position. In this case, the broadcast signal receiver may perform time/frequency synchronization by obtaining the position of the common CP set and the additional CP set as described with respect to the transmitter and comparing the obtained pilot signals with the pilot signals detected from a received signal.

In this document, the DP refers to as the Physical Layer Pipe (PLP), and PLS1 information may be called Layer (L1) static information, and PLS2 information may be called L1 dynamic information.

It should be clearly understood by those skilled in the art that various modifications and changes of the present invention can be made without leaving the technical principles and scope of the present invention. Therefore, it should be understood that the present invention includes the modifications and changes of the present invention supported by the appended claims and their equivalents.

This document describes all of the apparatus and methods related to the present invention, and descriptions thereof can be applied in a complementary manner.

What is claimed is:

1. A broadcast signal receiver comprising:
    a synchronizer/demodulator configured to perform signal detection and Orthogonal Frequency Division Multiplexing (OFDM) demodulation on a received broadcast signal;
    a frame parser configured to derive service data by parsing a signal frame of the received broadcast signal based on a number of carriers of the signal frame;
    a demapper and decoder configured to convert the service data into a bit domain and perform deinterleaving; and
    an output processor configured to receive the service data and output a data stream,
    wherein the synchronizer/demodulator further comprises a pilot signal detecting module configured to detect a pilot signal including Continual Pilots (CPs) and Scattered Pilots (SPs) from the received broadcast signal, and
    wherein the number of carriers of the signal frame is determined as a maximum number of carriers or determined by reducing a unit from the maximum number of carriers, the unit is obtained by multiplying a control unit value by a reducing coefficient and the control unit value corresponds to a predetermined number of carriers which are determined based on a Fast Fourier Transform (FFT) size.

2. The broadcast signal receiver of claim 1, wherein the control unit value corresponds to 96 when an 8K FFT size is used, 192 when a 16K FFT size is used and 384 when a 32K FFT size is used.

3. The broadcast signal receiver of claim 1, wherein the CPs include a common CP set and an additional CP set.

4. The broadcast signal receiver of claim 3, wherein the common CP set includes a first CP set for a 32K FFT mode, a second CP set for a 16K FFT mode, and a third CP set for an 8K FFT mode, and
    the first CP set, the second CP set, and the third CP set are generated by using a predetermined first reference CP set.

5. The broadcast signal receiver of claim 4, wherein the first CP set is generated by adding a second reference CP set to the first reference CP set and the second reference CP set is generated by reversing and shifting the first reference CP set.

6. The broadcast signal receiver of claim 5, wherein the second CP set is generated by using CPs of every second index from CPs included in the first CP set.

7. The broadcast signal receiver of claim 5, wherein the third CP set is generated by using CPs of every fourth index from CPs included in the first CP set.

8. The broadcast signal receiver of claim 3, wherein the additional CP set is placed at a carrier location of the SPs for ensuring a constant number of data carriers in every data symbol of the signal frame, and
    wherein the additional CP set depends on an SP pattern and the FFT size.

9. The broadcast signal receiver of claim 8, wherein the additional CP set for a specific SP pattern and a specific FFT size is placed differently according to the reducing coefficient.

10. A method for receiving a broadcast signal, the method comprising:
    performing signal detection and OFDM demodulation on a received broadcast signal;
    deriving service data by parsing a signal frame of the received broadcast signal based on a number of carriers of the signal frame;
    converting the service data into bit domain and performing deinterleaving; and
    receiving the service data and outputting a data stream,
    wherein the performing signal detection and Orthogonal Frequency Division Multiplexing (OFDM) demodulation further comprises detecting a pilot signal including Continual Pilots (CPs) and Scattered Pilots (SPs) from the received broadcast signal, and
    wherein the number of carriers of the signal frame is determined as a maximum number of carriers or determined by reducing a unit from the maximum number of carriers, the unit is obtained by multiplying a control unit value by a reducing coefficient, and the control unit value corresponds to a predetermined number of carriers which are determined based on a Fast Fourier Transform (FFT) size.

11. The method of claim 10, wherein the control unit value corresponds to 96 when an 8K FFT size is used, 192 when a 16K FFT size is used and 384 when a 32K FFT size is used.

12. The method of claim 10, wherein the CPs include a common CP set and an additional CP set.

13. The method of claim 12, wherein the common CP set includes a first CP set for a 32K FFT mode, a second CP set for a 16K FFT mode, and a third CP set for an 8K FFT mode, and the first CP set, the second CP set, and the third CP set are generated by using a predetermined first reference CP set.

14. The method of claim 13, wherein the first CP set is generated by adding a second reference CP set to the first reference CP set and the second reference CP set is generated by reversing and shifting the first reference CP set.

15. The method of claim 14, wherein the second CP set is generated by using CPs of every second index from CPs included in the first CP set.

16. The method of claim 14, wherein the third CP set is generated by using CPs of every fourth index from CPs included in the first CP set.

17. The method of claim 12, wherein the additional CP set is placed at a carrier location of the SPs for ensuring a constant number of data carriers in every data symbol of the signal frame, and the additional CP set depends on an SP pattern and the FFT size.

18. The method of claim 17, wherein the additional CP set for a specific SP pattern and a specific FFT size is placed differently according to the reducing coefficient.

* * * * *